US012200691B2

(12) United States Patent
Ibrahim et al.

(10) Patent No.: US 12,200,691 B2
(45) Date of Patent: Jan. 14, 2025

(54) REPETITION CANCELLATION IN FULL DUPLEX COMMUNICATIONS

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Gokul Sridharan, Sunnyvale, CA (US); Hung Dinh Ly, San Diego, CA (US); Ahmed Attia Abotabl, San Diego, CA (US); Hwan Joon Kwon, San Diego, CA (US); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/652,655

(22) Filed: Feb. 25, 2022

(65) Prior Publication Data

US 2023/0276434 A1 Aug. 31, 2023

(51) Int. Cl.
*H04W 72/1268* (2023.01)
*H04L 1/08* (2006.01)
(Continued)

(52) U.S. Cl.
CPC ........... *H04W 72/1268* (2013.01); *H04L 1/08* (2013.01); *H04L 5/14* (2013.01); *H04W 72/23* (2023.01)

(58) Field of Classification Search
CPC ...... H04W 72/23; H04W 72/1268; H04L 1/08
See application file for complete search history.

(56) References Cited

U.S. PATENT DOCUMENTS

2020/0100279 A1\* 3/2020 Al-Imari ............... H04L 5/0073
2020/0267756 A1\* 8/2020 Fakoorian ............. H04W 72/23
(Continued)

FOREIGN PATENT DOCUMENTS

WO 2021090297 A1 5/2021

OTHER PUBLICATIONS

International Search Report and Written Opinion—PCT/US2023/061684—ISA/EPO—Apr. 28, 2023.

*Primary Examiner* — Melanie Jagannathan
(74) *Attorney, Agent, or Firm* — Patterson & Sheridan, LLP

(57) ABSTRACT

Certain aspects of the present disclosure provide techniques for repetition cancellation in full duplex communications. A method of wireless communication includes receiving scheduling information from a base station, wherein: the scheduling information schedules transmission of a plurality of uplink channel repetitions in a plurality of slots, the plurality of uplink channel repetitions is associated with a first sequence of redundancy versions (RVs), each repetition in the plurality of uplink channel repetitions assigned a different RV in the first sequence of RVs, and the plurality of slots include at least one full duplex slot comprising an uplink subband for uplink transmissions and a downlink subband for downlink transmissions; receiving an indication to cancel one or more repetitions of the plurality of uplink channel repetitions scheduled by the scheduling information; and taking one or more actions related to transmitting one or more remaining non-canceled repetitions of the plurality of UL channel repetitions.

28 Claims, 15 Drawing Sheets

(51) Int. Cl.
    *H04L 5/14*          (2006.01)
    *H04W 72/23*       (2023.01)

(56) References Cited

U.S. PATENT DOCUMENTS

| | | |
|---|---|---|
| 2021/0184812 A1* | 6/2021 | MolavianJazi ....... H04L 1/0041 |
| 2021/0337489 A1 | 10/2021 | Abotabl |
| 2021/0392666 A1 | 12/2021 | Huang |
| 2022/0210793 A1* | 6/2022 | Behravan ............ H04W 12/106 |
| 2023/0039872 A1* | 2/2023 | Khoshkholgh Dashtaki ............... H04W 72/1268 |
| 2023/0189255 A1* | 6/2023 | Bagheri ................ H04L 1/1812 370/329 |
| 2023/0247638 A1* | 8/2023 | Ouchi ................ H04L 27/2602 370/329 |
| 2024/0072936 A1* | 2/2024 | Behravan ............ H04L 1/1819 |

\* cited by examiner

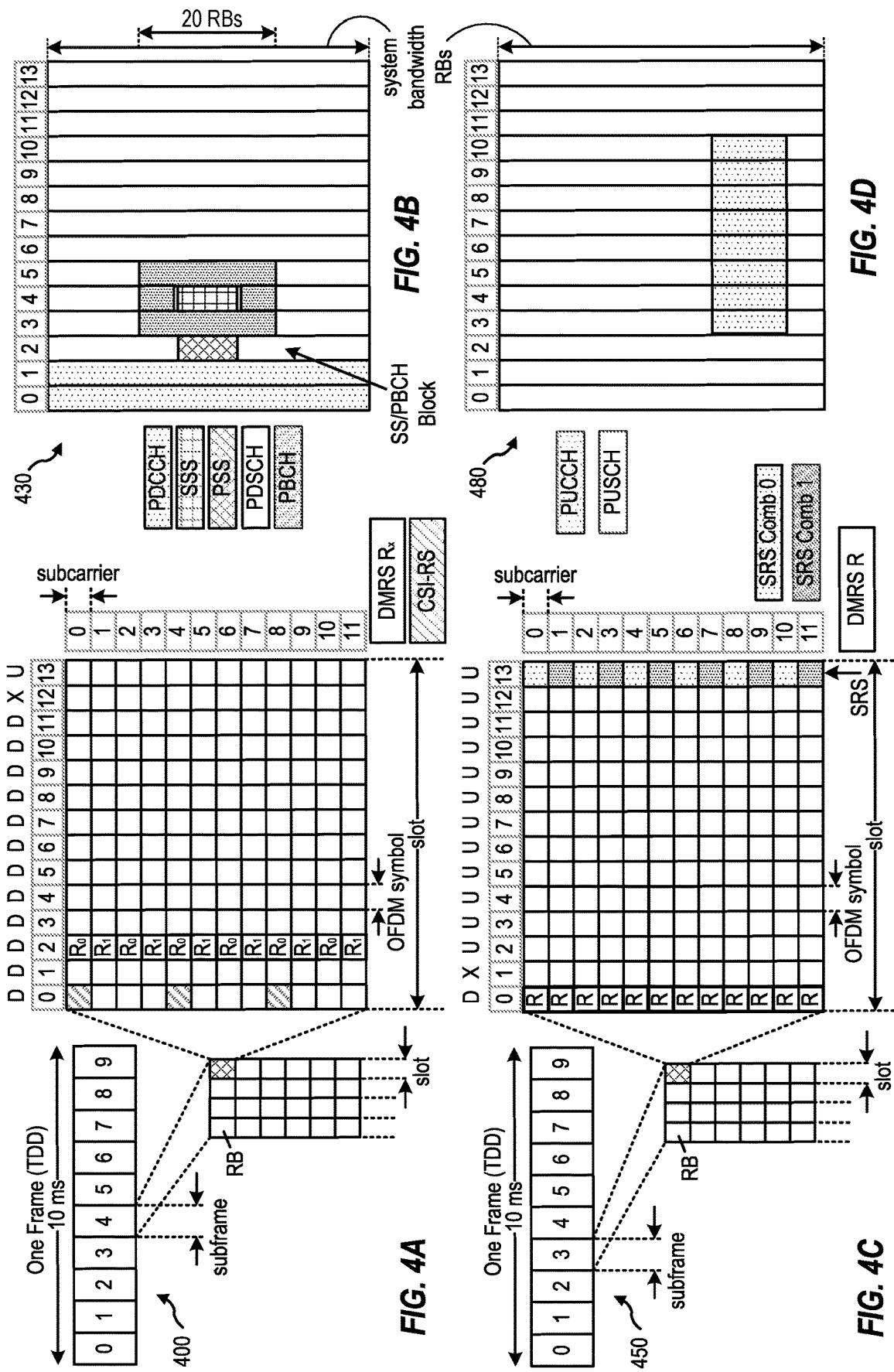

REPETITION CANCELLATION IN FULL DUPLEX COMMUNICATIONS

BACKGROUND

Field of the Disclosure

Aspects of the present disclosure relate to wireless communications, and more particularly, to techniques for transmission of repetitions.

Description of Related Art

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available wireless communication system resources with those users Although wireless communication systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communication systems, increasing the ability for different types of devices to intercommunicate, increasing the number and type of wireless communication mediums available for use, and the like. Consequently, there exists a need for further improvements in wireless communications systems to overcome the aforementioned technical challenges and others.

SUMMARY

One aspect provides a method for wireless communication by a user equipment (UE). The method generally includes receiving scheduling information from a network entity. The scheduling information schedules transmission of a plurality of uplink (UL) channel repetitions in a plurality of slots. The plurality of UL channel repetitions is associated with a first sequence of redundancy versions (RVs), each repetition in the plurality of UL channel repetitions assigned a different RV in the first sequence of RVs. The plurality of slots include at least one full duplex (FD) slot comprising an UL subband for uplink transmissions and a downlink (DL) subband for DL transmissions. The method also includes receiving an indication to cancel one or more repetitions of the plurality of UL channel repetitions scheduled by the scheduling information; and taking one or more actions related to transmitting one or more remaining non-canceled repetitions of the plurality of UL channel repetitions.

One aspect provides a method for wireless communication by a network entity. The method generally includes transmitting scheduling information to a user equipment (UE). The scheduling information schedules transmission of a plurality of uplink (UL) channel repetitions in a plurality of slots. The plurality of UL channel repetitions is associated with a first sequence of redundancy versions (RVs), each repetition in the plurality of UL channel repetitions assigned a different RV in the first sequence of RVs. The plurality of slots include at least one full duplex (FD) slot comprising an UL subband for uplink transmissions and a downlink (DL) subband for DL transmissions. The method also includes transmitting, to the UE, an indication to cancel one or more repetitions of the plurality of UL channel repetitions scheduled by the scheduling information; and taking one or more actions related to receiving one or more remaining non-canceled repetitions of the plurality of UL channel repetitions.

Other aspects provide: an apparatus operable, configured, or otherwise adapted to perform the aforementioned methods as well as those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 4A, 4B, 4C, and 4D depict various example aspects of data structures for a wireless communication network.

DETAILED DESCRIPTION

Figure 1:
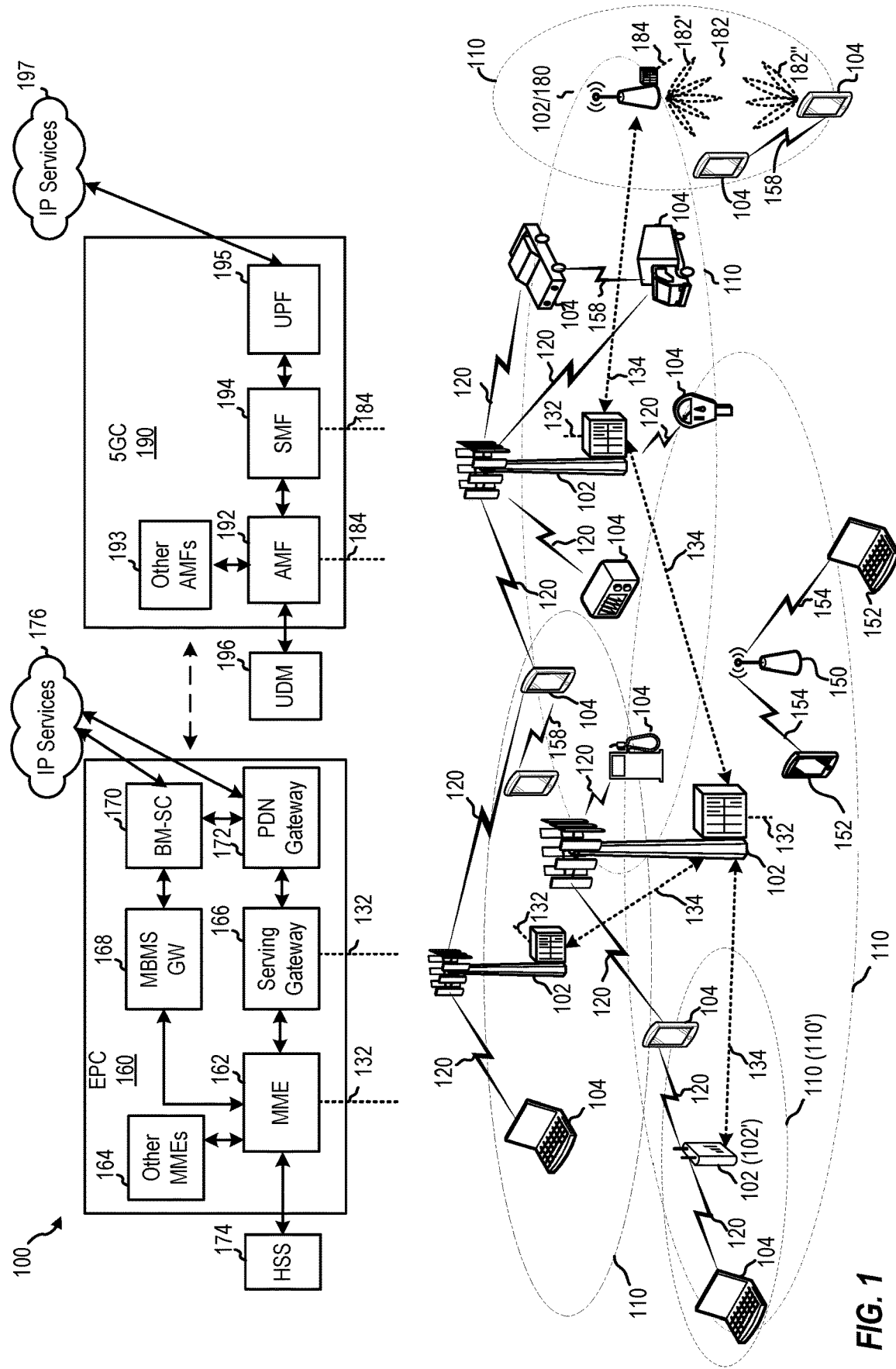
FIG. 1 depicts an example wireless communication network.

Aspects of the present disclosure provide apparatuses, methods, processing systems, and computer-readable mediums for repetition cancellation in full duplex communications.

In certain cases, a user equipment (UE) may repeat certain transmissions (such as data transmissions), for example, to improve the reliability of communications between the UE and network. Certain wireless communication networks (e.g., 5G New Radio (NR)) may support subband full duplex (SBFD) communications, where full duplex communications may be allocated at a subband level within a time-domain resource, such as a slot, sub-slot, or symbol. SBFD may result, in some cases, in symbols of a slot, in which repetitions are to be transmitted, having frequency resources (e.g., uplink subbands) allocated for uplink transmissions as well as frequency resources (e.g., downlink subbands) allocated for downlink transmissions. In certain cases, the network may indicate to one or more UEs to cancel an uplink transmission via an uplink cancellation indication (ULCI). In some cases, the ULCI may allow some of the repetitions to remain scheduled for transmission. It may be unclear how to handle non-canceled repetition(s) across uplink resources and full duplex resources.

Aspects of the present disclosure provide methods and apparatus for taking action(s) associated with non-canceled uplink repetitions based on certain criteria. For example, a UE may determine whether to refrain from transmitting non-canceled repetition(s) on certain criteria, such as the number of resource elements (REs) allocated to non-canceled repetition(s), transport block size (TBS) associated with the non-canceled repetition(s), and/or a code rate associated with the non-canceled repetition(s). For example, the UE may determine to refrain from transmitting the non-canceled repetition(s) if the number of REs allocated to the non-canceled repetition(s) is greater than or equal to a total number of REs allocated to all of the repetitions adjusted by an adjustment factor, for example, as further described herein with respect to FIG. 9.

The repetition cancellation described herein may enable improved wireless communication performance, such as reduced latencies and/or increased throughput. For example, the repetition cancellation may enable transmission of self-decodable repetition(s), repetitions that satisfy a performance metric, and/or repetitions with an updated redundancy version or sequence of redundancy versions. Such repetitions may enable a transmitter to transmit decodable repetitions to a receiver, which may provide improved wireless communication performance.

Introduction to Wireless Communication Networks

The techniques and methods described herein may be used for various wireless communications networks. While aspects may be described herein using terminology commonly associated with 3G, 4G, and/or 5G wireless technologies, aspects of the present disclosure may likewise be applicable to other communication systems and standards not explicitly mentioned herein.

FIG. 1 depicts an example of a wireless communication network 100, in which aspects described herein may be implemented.

Generally, wireless communication network 100 includes various network entities (alternatively, network elements or network nodes), which are generally logical entities associated with, for example, a communications device and/or a communication function associated with a communications device. For example, various functions of a network as well as various devices associated with and interacting with a network may be considered network entities.

In the depicted example, wireless communication network 100 includes base stations (BSs) 102, user equipments (UEs) 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with UEs 104 via communications links 120. The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

FIG. 1 depicts various example BSs 102, which may more generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and others. Each of BSs 102 may provide communication coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communication coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
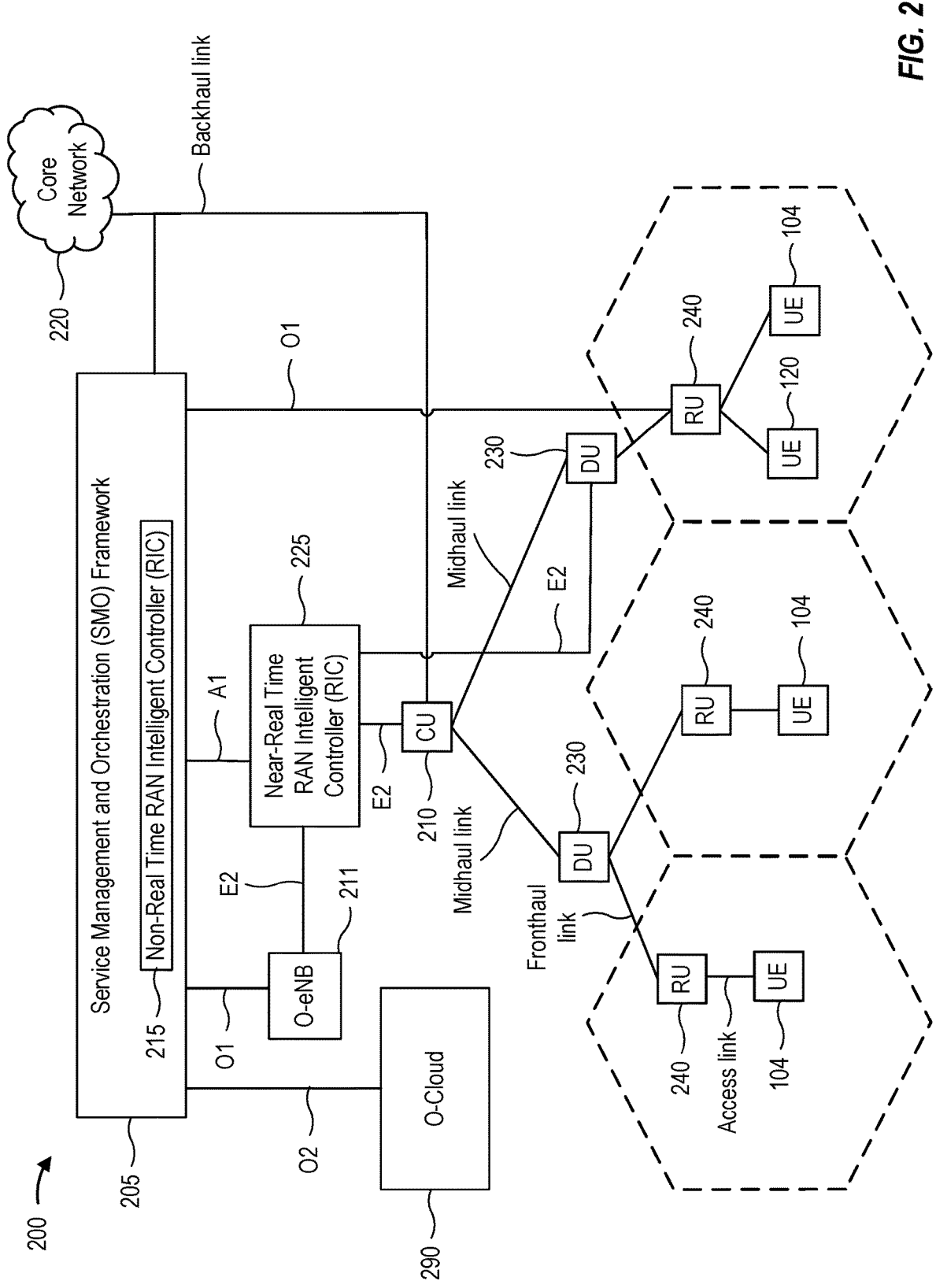
FIG. 2 depicts an example disaggregated base station architecture.

While BSs 102 are depicted in various aspects as unitary communications devices, BSs 102 may be implemented in various configurations. For example, one or more components of base station may be disaggregated, including a central unit (CU), one or more distributed units (DUs), one or more radio units (RUs), a radio unit (RU), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communication network 100 may also be configured to support different radio access technologies, such as 3G, 4G, and 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communication network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 600 MHz-6 GHz, which is often referred to (interchangeably) as "Sub-6 GHz". Similarly, 3GPP currently defines Frequency Range 2 (FR2) as including 26-41 GHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communication links 120 between BSs 102 and, for example, UEs 104, may be through one or more carriers, which may have different bandwidths (e.g., 5, 10, 15, 20, 100, 400, and other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the base station 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communication network 100 further includes a Wi-Fi AP 150 in communication with Wi-Fi stations (STAs) 152 via communication links 154 in, for example, a 2.4 GHz and/or 5 GHz unlicensed frequency spectrum.

Certain UEs 104 may communicate with each other using device-to-device (D2D) communication link 158. D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172 in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
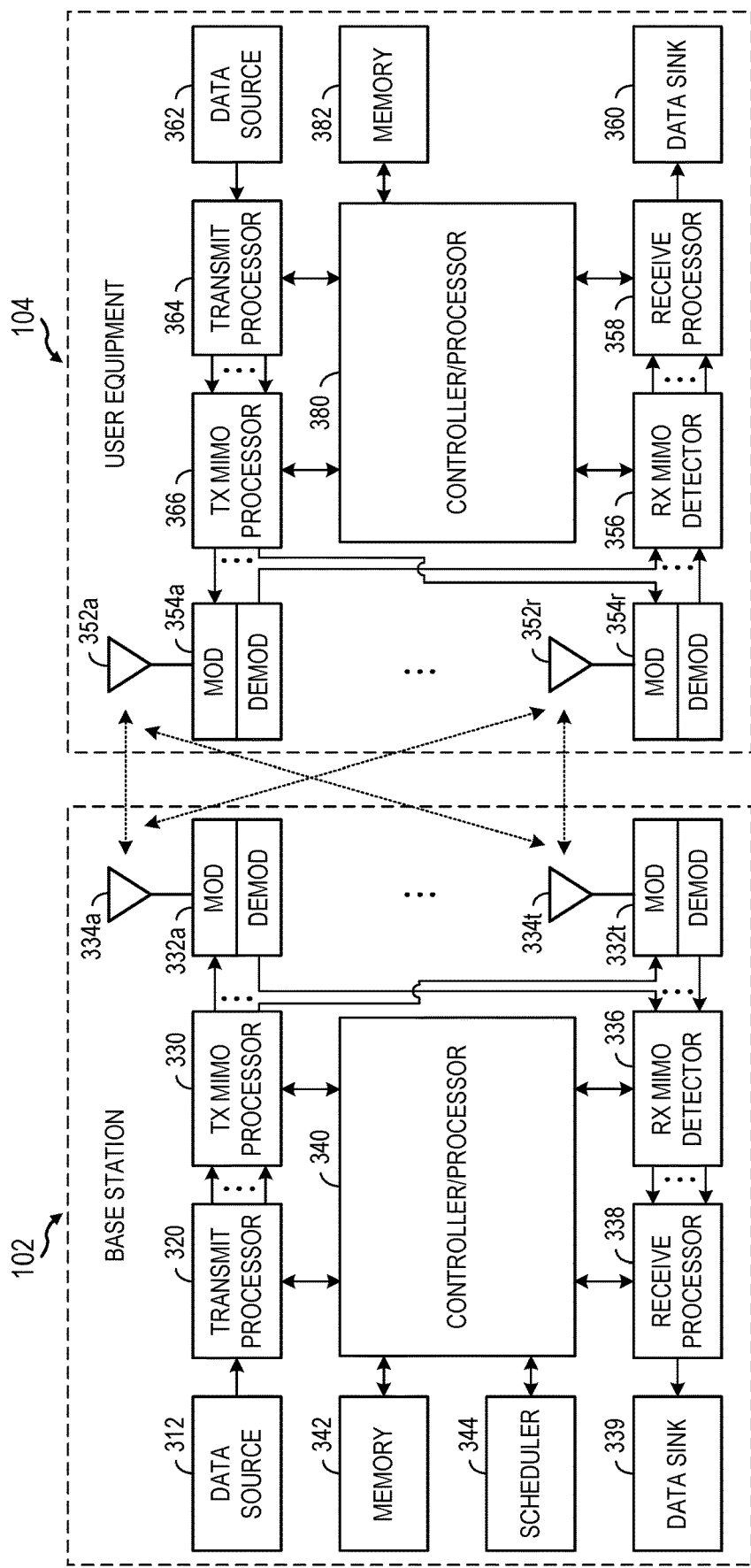
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., data source 362) and wireless reception of data (e.g., data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communication network, such as wireless communication network 100 of FIG. 1.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communication systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and in the time domain with SC-FDM.

A wireless communication frame structure may be frequency division duplex (FDD), in which for a particular set of subcarriers and subframes within the set of subcarriers are dedicated for either DL or UL. Wireless communication frame structures may also be time division duplex (TDD), in which for a particular set of subcarriers and subframes within the set of subcarriers are dedicated for both DL and UL.

In FIGS. 4A and 4C, the wireless communication frame structure is TDD where D is DL, U is UL, and X is flexible for use between DL/UL. UEs may be configured with the slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot configuration. Subframes may also include minislots, which generally have fewer symbols than an entire slot. Other wireless communication technologies may have a different frame structure and/or different channels.

Generally, the number of slots within a subframe is based on a slot configuration and a numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and channel state information reference signals (CSI-RS) for channel estimation at the UE. The RS may also include beam measurement RS (BRS), beam refinement RS (BRRS), and phase tracking RS (PT-RS).

FIG. 4B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may also transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Introduction to Multi-Antenna Panel and
Full-Duplex Communication

In certain systems, such as the wireless communication network 100 of FIG. 1, UEs and BSs may be able to transmit or receive transmissions using multiple antennas, beams, and/or antenna panels (e.g., antenna element arrays). An antenna panel may comprise a collection of transceiver units (TXRUs) that are capable of generating an analog beam. In some cases, when a dual-polarized array is used, the one beam may correspond to two antenna ports. In some cases, same sets or different sets of antenna panels can be used for DL reception and UL transmission. For example, in some cases, the same set of antenna panels may be used for both DL reception and UL transmission while in other cases different sets of antenna panels could be used for DL reception as compared to UL transmission.

Additionally, antenna panels can be associated with the same as well as different numbers of antenna ports, a number of beams, and/or an effective isotropic radiated power (EIRP). In some cases, while different antenna panels may share a same number of beams, there may not be beam correspondence across different antenna panels. Further, in some cases, each antenna panel may be associated with the same or independent operation parameters, such as power control (PC) parameters, a fast Fourier transform timing window, a time advance (TA) parameter, and the like. Additionally, each antenna panel of the UE may be associated with a particular panel identifier (ID) or an antenna panel group ID. In some cases, the antenna panel ID or antenna panel group ID may include one or more of a beam group ID, a transmission configuration indicator (TCI) state pool ID, a sounding reference signal (SRS) resource group ID, a control resource set (CORESET) pool ID, or a closed loop power control index.

In some cases, the capability to perform transmissions using multiple panels may be especially useful for higher frequency transmission, such as millimeter wave transmissions described above. In some cases, the transmissions associated with a UE may be received from or transmitted to a serving BS or transmission reception point (TRP) via a Uu interface. Generally, transmissions using multiple antenna panels may allow for increased throughput (e.g., by simultaneously or concurrently transmitting/receiving data to/from the BS using the multiple antenna panels) and/or increased reliability (e.g., by sending/receiving the same information using the multiple antenna panels). Such transmissions may be referred to as multi-panel transmissions.

As noted above, in some cases, wireless communications devices, such as UEs and BSs, may communicate using multiple antenna panels. In some cases, the multiple antenna panels may be used for half-duplex (HD) communication, such as in current 5G new radio (NR) communication systems, in which downlink (DL) and uplink (UL) transmissions are transmitted non-simultaneously (e.g., transmitted in different time resources). HD communication may be considered baseline behavior in Release 15 (R-15) and 16 (R-16) of 5G NR. In other cases, the use of multiple antenna panels may allow for full duplex (FD) communication whereby uplink (UL) and downlink (DL) transmissions may be performed simultaneously (e.g., in the same time resources). For example, in some cases, UL transmission by the UE may be performed on one panel while DL reception may be performed simultaneously on another panel of the UE. Likewise, at a BS, DL transmission by the BS may be performed on one antenna panel while UL reception may be performed on another antenna panel.

FD capability may be conditioned on beam separation (e.g., frequency separation or spatial separation) and may still be subject to certain self-interference between UL and DL (e.g., UL transmission directly interferes with DL reception) as well as clutter echo (e.g., where UL transmission echoes affect UL transmission and/or DL reception). However, while FD capability may be subject to certain interference, FD capability provides for reduced transmission and reception latency (e.g., it may be possible to receive DL transmissions in an UL-only slot), increased spectrum efficiency (e.g., per cell and/or per UE), and more efficient resource utilization.

Figure 5A:
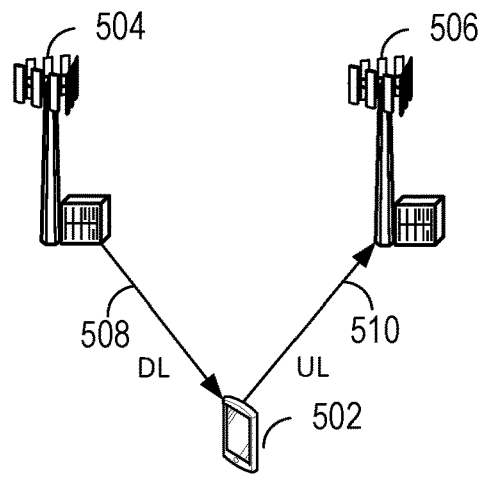
FIGS. 5A, 5B, and 5C illustrates various full-duplex use cases within a wireless communication network.
Figure 5B:
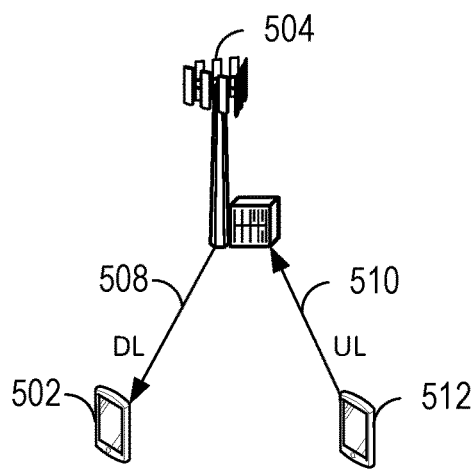
Figure 5C:
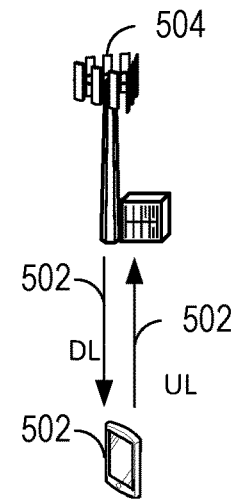

FIGS. 5A, 5B, and 5C illustrate different FD use cases within a wireless communication network, such as the wireless communication network 100. For example, FIG. 5A illustrates a first FD use case involving transmission between one UE 502 and two base stations (or multiple transmission reception points (mTRP)), BS 504 and BS 506. In some cases, UE 502 may be representative of UE 104 of FIG. 1 and BSs 504, 506 may be representative of BS 102 of FIG. 1. As shown, the UE 502 may simultaneously receive DL transmissions 508 from the BS 506 and transmit UL transmissions 510 to the BS 506. In some cases, the DL transmissions 508 and UL transmissions 510 may be performed using different antenna panels to facilitate the simultaneous transmission and reception.

A second FD use case is illustrated in FIG. 5B involving two different UEs and one BS. As illustrated, the UE 502 may receive DL transmissions 508 from the BS 504 while another UE 512 may simultaneously transmit UL transmission 510 to the BS 504. Thus, in this example, BS 504 is conducting simultaneous uplink and downlink communications.

A third FD use case is illustrated in FIG. 5C involving one BS and one UE. As illustrated, the UE 502 may receive DL transmissions 508 from the BS 504 and may simultaneously transmit UL transmissions 510 to the BS 504. As noted above, such simultaneous reception/transmission by the UE 502 may be facilitated by different antenna panels.

FD communication may be facilitated through the use of frequency division multiplexing (FDM) or spatial division multiplexing (SDM). In FDM, the simultaneous UL and DL transmissions may be transmitted in the same time resources but on separate frequency bands separated by a guard band. In SDM, the simultaneous UL and DL transmissions may transmitted on the same time and frequency resources but spatially separated into different, directional transmission beams. Such FD communication contrasts with HD communication that uses time division multiplexing (TDM) in which UL and DL transmissions are scheduled on the same or different frequency resources, but different time resources.

Introduction to Repetitions and Redundancy Version Cycling

In some cases, a UE may be scheduled to transmit uplink data on a PUSCH. A BS may schedule uplink transmissions on the PUSCH by transmitting, to the UE, DCI that includes a dynamic grant (DG) or transmitting RRC signaling to the UE that includes a configured grant (CG).

DGs may include an indication of one or more time and frequency resources for transmitting an uplink transmission on the PUSCH. In some cases, the one or more time and frequency resources may be non-periodic and may be allocated to the UE for a particular uplink transmission. As such, when another uplink transmission is scheduled for the UE, the BS may transmit another dynamic grant with additional scheduling information for this other uplink transmission. Conversely, CGs allocate a periodic set of time and frequency resources to the UE, which may be shared with one or more other UEs. For example, the BS may transmit a CG that allocates the resources to multiple UEs, and each of the UEs may use the resources when the respective UE has data to transmit.

When scheduled, the UE may transmit uplink data in a transport block (TB) on the PUSCH. In some cases, for example, to improve data transmission coverage of uplink transmissions, the UE may repeat transmission of the TB over multiple slots, known as PUSCH repetition. In some cases, one TB may be transmitted in one slot and one or more copies (e.g., repetitions) of the TB may be transmitted over multiple slots. The multiple copies/repetitions of the TB may be transmitted using different redundancy versions (RVs). In some aspects, performance may be improved by transmitting one TB over time resources in multiple slots. In other words, a single TB may span across multiple slots, reducing the modulation and coding scheme (MCS) (e.g., code rate) associated with the TB. The reduced code rate results in increased reliability associated with data transmission. The code rate may be a ratio between information bits and total transmitted bits (e.g., information bits and redundant and/or parity bits). Redundant and/or parity bits may be added to a data transmission (e.g., a TB) for forward error correction. Coding rate may also refer to a code rate. Channel coverage may be improved by repeating the same data (possibly with different RVs) in multiple TBs, allowing a receiver (e.g., BS) to combine the TBs for decoding of the data.

Figure 6A:
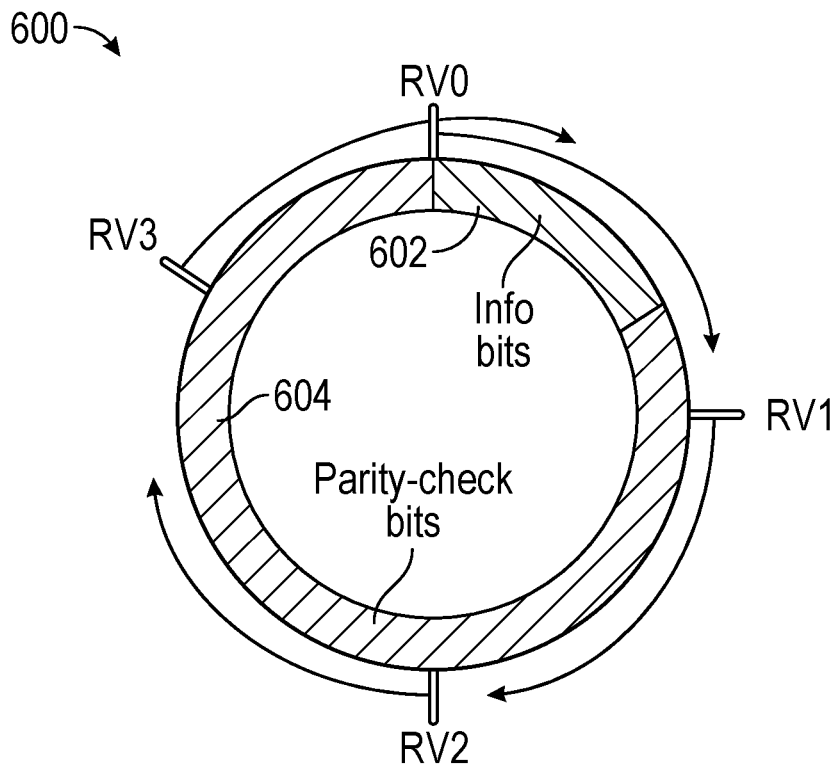
FIG. 6A is a diagram illustrating an example of a redundancy version circular buffer.

FIG. 6A is a diagram illustrating an example of a RV circular buffer 600. The RV circular buffer 600 may be used for arranging information bits 602 (e.g., systematic bits) and parity bits 604 of a data transmission (e.g., a TB). A wireless device may encode a set of information bits using an error correcting code, such as a low-density parity check (LDPC) code or a polar code, to generate an encoded bit stream. The wireless device may store the encoded bit stream in the RV circular buffer 600, which may be arranged with different sets of contiguous bits for reading the encoded bits. The sets of contiguous bits may be referred to as RVs. Each of the RVs may have a different starting point (e.g., starting bit) in the RV circular buffer 600. In this example, the RV circular buffer 600 has four sets of contiguous bits for reading the encoded bits: RV0, RV1, RV2, and RV3. As shown, RV0 and RV3 may include information bits 602 and parity bits 604; and RV1 and RV2 may include only parity bits 604.

To determine bits for a transmission, the wireless device may select a starting bit (e.g., a particular RV) in the RV circular buffer 600. For example, the wireless device may select to start reading the encoded bits at RV0 or RV2. The wireless device may read the contiguous set of bits associated with the selected RV from the RV circular buffer 600 for the transmission. The wireless device may select another RV to read a contiguous set of bits from the circular buffer for a repetition. The UE may select a RV for each repetition instance. The RV may point to the starting location of a sequence of encoded bits, which are used as the payload for the particular repetition. The wireless device may cycle through the RVs to determine the bits for a transmission and the respective repetition(s), where the wireless device may be configured with various sequences of RVs to use for RV cycling. In some cases, irrespective of whether an actual transmission occurs or not in a transmission occasion, the RV index may be advanced as per the indicated sequence. In certain cases, the RV index may be advanced as per the indicated sequence only if an actual transmission occurs in a transmission occasion.

For a PUSCH transmission scheduled by certain control signaling (e.g., DCI format 0_1, or 0_2, or 0_0), the RV to be applied on the nth transmission occasion of the TB, where n=0, 1, ... N·K−1, may be determined according to Table 1, where m=(n−(n mod N))/N. As an example, if the DCI scheduling the PUSCH indicates that a redundancy version identifier ($rv_{id}$) is set to a value of 0, the UE may use {0, 2, 3, 1} as the sequence of RVs for RV cycling.

TABLE 1

Redundancy version for PUSCH transmission

| $rv_{id}$ indicated by the DCI scheduling the PUSCH | $rv_{id}$ to be applied to $n^{th}$ transmission occasion (repetition Type A) or TB processing over multiple slots or $n^{th}$ actual repetition (repetition Type B) | | | |
|---|---|---|---|---|
| | (m) mod 4 = 0 | (m) mod 4 = 0 | (m) mod 4 = 0 | (m) mod 4 = 0 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

Figure 6B:
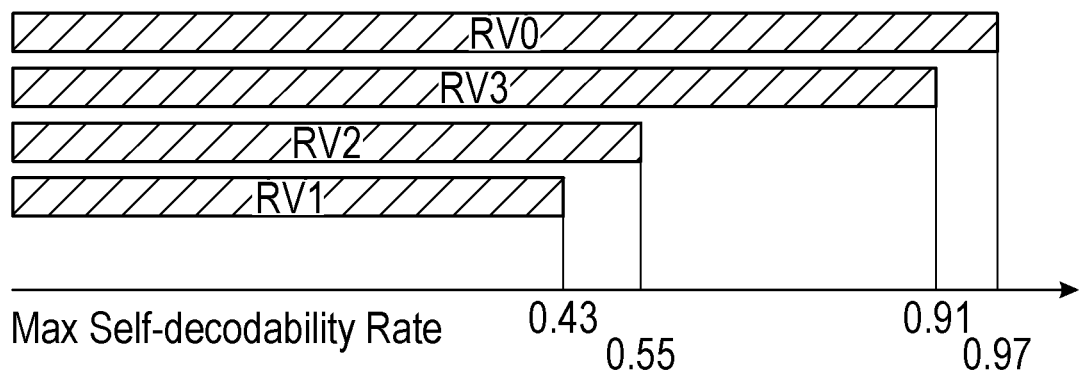
FIG. 6B is a diagram illustrating example self-decodability rates associated with different redundancy versions.

In certain aspects, a RV may be considered self-decodable if a receiver can use that RV in isolation to successfully decode the transmitted data. FIG. 6B is a diagram illustrating example maximum self-decodability rates associated with different RVs. As shown, with information bits, RV0 and RV3 have a higher maximum self-decodability rate compared to RV1 and RV2, which only include parity bits. In this example, RV0 and RV3 may be considered self-decodable RVs, whereas RV1 and RV2 may not be considered self-decodable for a given coding rate.

In certain cases, the starting bit location of an RV may depend on a base graph used for the error correction code (e.g., LDPC). Certain wireless communication systems (e.g., 5G NR) may support two types of base graphs: base graph 1 (BG1) and BG2. Table 2 shows the starting bit location for certain RVs associated with BG1 and BG2. The base graph may be selected based on the code rate and/or the payload size of the information bits.

TABLE 2

RV Starting Bit Locations

| RV | BG1 | BG2 |
|---|---|---|
| 0 | 0 | 0 |
| 1 | $\left\lfloor \frac{17N_{cb}}{66Z_c} \right\rfloor Z_c$ | $\left\lfloor \frac{13N_{cb}}{50Z_c} \right\rfloor Z_c$ |
| 2 | $\left\lfloor \frac{33N_{cb}}{66Z_c} \right\rfloor Z_c$ | $\left\lfloor \frac{25N_{cb}}{50Z_c} \right\rfloor Z_c$ |
| 3 | $\left\lfloor \frac{56N_{cb}}{66Z_c} \right\rfloor Z_c$ | $\left\lfloor \frac{43N_{cb}}{50Z_c} \right\rfloor Z_c$ |

$Z_c$ is the lifting size; $N_{cb}$ is the circular buffer length, where for smaller TBS, $N_{cb}=66Z_c$ for BG 1, and $N_{cb}=50Z_c$ for BG2. The starting bit locations of all RVs may be at an integer multiple of the lifting size $Z_c$.

Different types of PUSCH repetition may be used, such as PUSCH repetition type-A and PUSCH repetition type-B. For PUSCH repetition type-A, time gaps may be arranged consecutive repetitions, which are not allowed to cross a slot boundary. For PUSCH repetition type-B, the repetitions may be arranged in a contiguous set of time-domain resources (e.g., symbols) and allowed to cross a slot boundary. PUSCH repetition type-B may be used for URLLC service or other low latency services, for example. Both PUSCH repetition types may be applicable to DG and CG.

PUSCH repetitions are transmitted within uplink resources (e.g., an uplink subband) of a slot. In certain systems, frequency resources and symbols within a slot allocated for transmission of PUSCH repetitions included only uplink frequency resources (e.g., only an uplink subband). In emerging systems, there may be cases in which subband full duplex (SBFD) is supported by a base station within certain slots. SBFD may result, in some cases, in symbols (or slots) of a slot, in which PUSCH repetitions are to be transmitted, having frequency resources (e.g., uplink subbands) allocated for uplink transmissions as well as frequency resources (e.g., downlink subbands) allocated for downlink transmissions. There may be cases in which frequency resources in a slot (sub-slot, or symbol) may be split among frequency resources for uplink transmissions and frequency resources for downlink transmissions.

Figure 7:
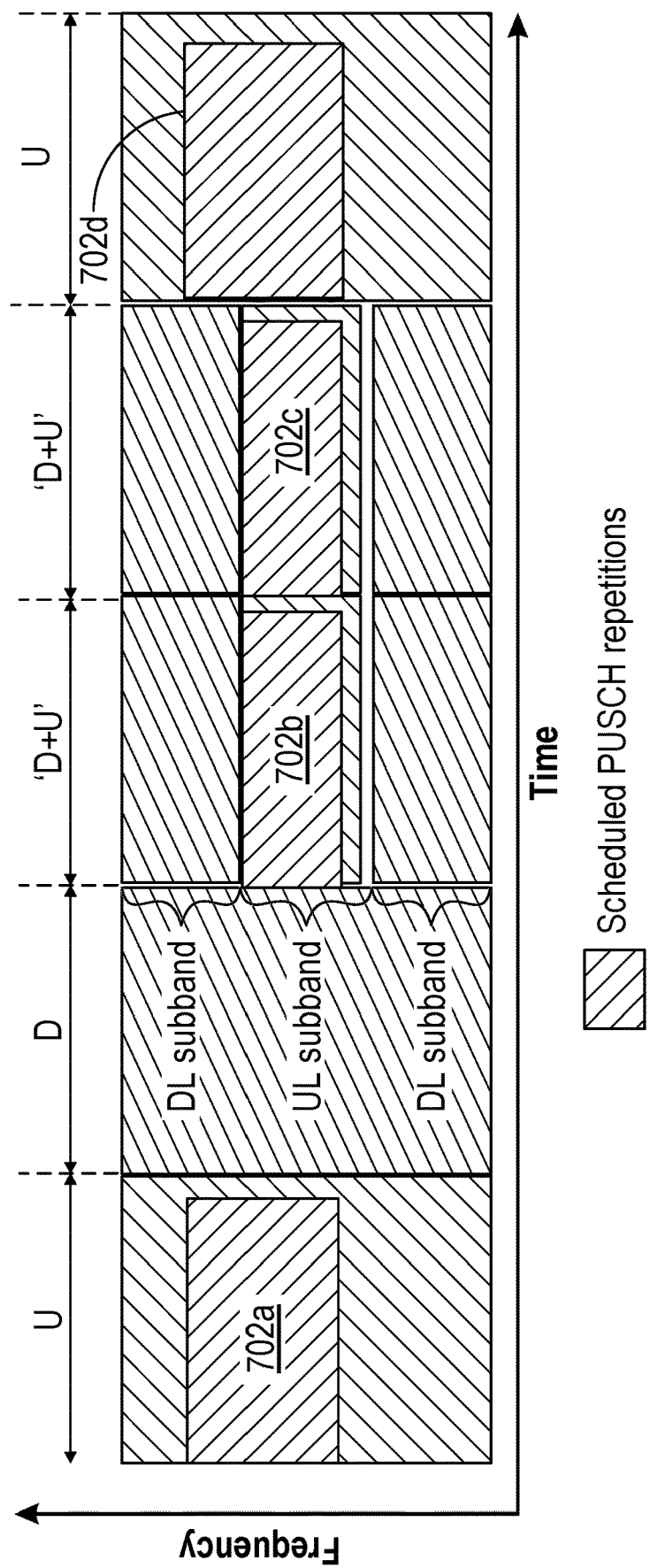
FIG. 7 is a diagram illustrating an example of uplink channel repetitions scheduled in subband full duplex resources.

FIG. 7 is a diagram illustrating an example of PUSCH repetitions scheduled in SBFD resources. The slots shown in FIG. 7 may be configured as a downlink (DL) slot (labeled "D"), an uplink (UL) slot (labeled "U"), or a full duplex slot (labeled "D+U"), which can have uplink and downlink resources allocated. In this example, a UE may be scheduled to transmit PUSCH repetitions 702a-d across uplink (U) and full duplex (D+U) slots. Each of the repetitions 702a-d may have certain number of frequency resources (e.g., resource elements (REs)) depending on the slot type. For example, the REs allocated for a PUSCH repetition in a full duplex slot (e.g., repetitions 702b, 702c) may be less than the REs allocated in an uplink slot (e.g., repetitions 702a, 702d). In certain aspects, the TB size (TBS) may be determined based on the frequency resources allocated in an uplink slot and maintained for all of the repetitions. Rate-matching may be used to arrange a uniform pattern across symbols, which may enable the same transmit power per symbol.

In certain cases, the network may indicate to one or more UEs to cancel an uplink transmission via an uplink cancellation indication (ULCI). As an example, when the network allocates resources to a URLLC UE, the network may also transmit an ULCI to eMBB UEs in order to ensure the wireless communication performance for the URLLC UE. In some cases, the ULCI may allow some repetitions to remain scheduled for transmission. It may be unclear how to handle non-canceled repetition(s) across uplink slots and full duplex slots, for example, as described herein with respect to FIG. 7. For example, a non-canceled repetition (e.g., with RV1) may not be decodable at the receiver without other repetitions (e.g., with RV0).

Aspects Related to Repetition Cancellation in Full Duplex Communications

Aspects of the present disclosure provide methods and apparatus for taking action(s) associated with non-canceled uplink repetitions based on certain criteria. According to certain aspects, a UE may determine whether to refrain from transmitting non-canceled repetition(s) or whether to update a RV associated with the non-canceled repetition(s) based on certain criteria, such as the number of resource elements (REs) allocated to non-canceled repetition(s), the RV associated with the non-canceled repetition(s), the transport block size (TBS) associated with the non-canceled repetition(s), and/or a code rate associated with the non-canceled repetition(s). For example, the UE may determine to refrain transmitting the non-canceled repetition(s) if the number of REs allocated to the non-canceled repetition(s) is greater than or equal to a total number of REs allocated to all of the repetitions adjusted by an adjustment factor, for example, as further described herein with respect to FIG. 9.

The repetition cancellation described herein may enable improved wireless communication performance, such as reduced latencies and/or increased throughput. For example, the repetition cancellation may enable transmission of self-decodable repetition(s), repetitions that satisfy a performance metric, and/or repetitions with an updated redundancy version or sequence of redundancy versions.

Example Operations of Entities in a Communication Network

Figure 8:
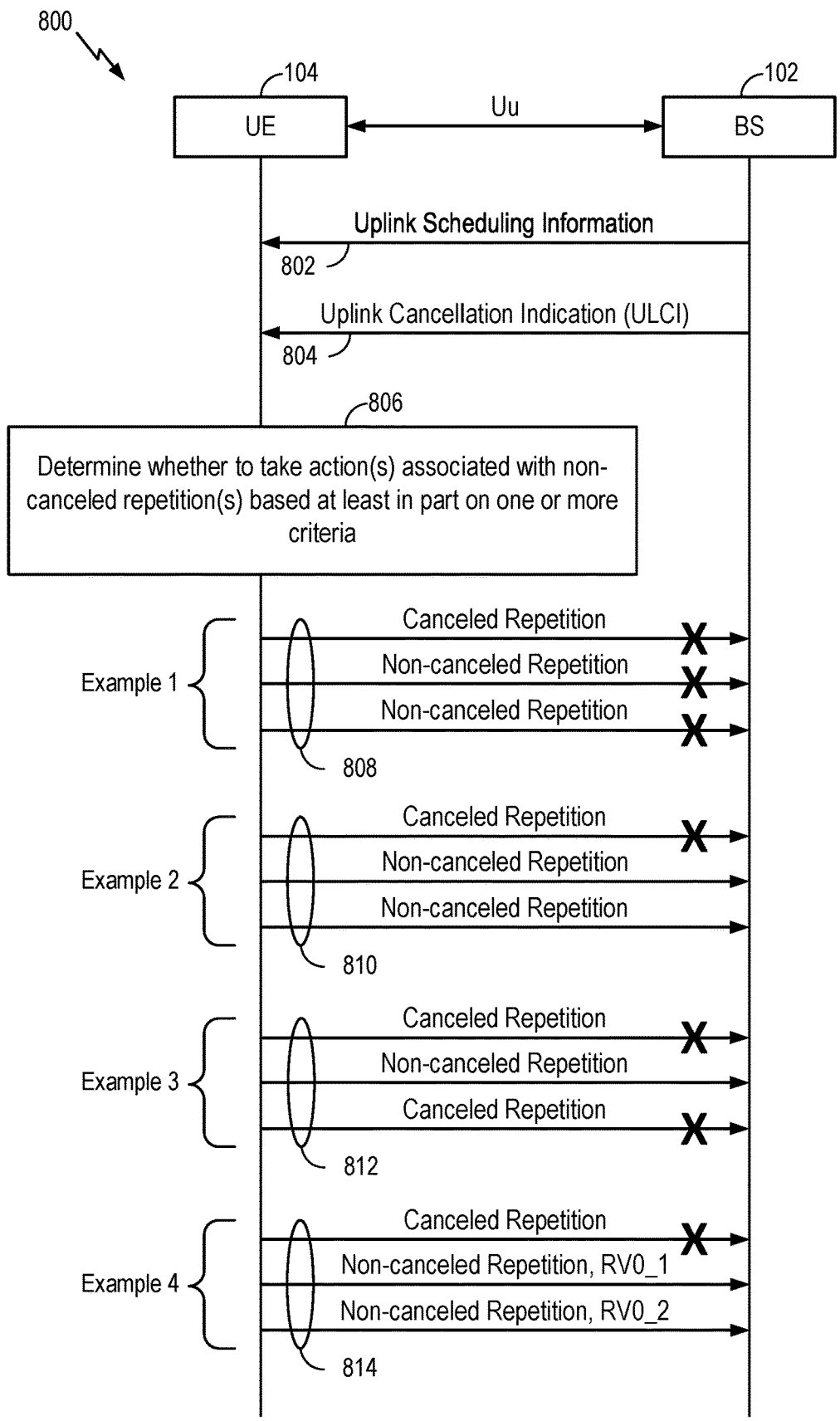
FIG. 8 depicts a process flow for communication in a network between a user equipment and a base station.

FIG. 8 depicts a process flow of operations 800 for communication in a network between a BS 102 and a UE 104. In some aspects, the BS may be an example of the BS 102 depicted and described with respect to FIGS. 1 and 3. Similarly, the UE may be an example of UE 104 depicted and described with respect to FIGS. 1 and 3. In certain aspects, the UE 104 may be another type of wireless communications device, and the BS 102 may be another type of network entity or network node, such as those described herein.

In step 802, the UE 104 may receive uplink (UL) scheduling information, such as DCI scheduling a DG and/or activating a CG. In certain aspects, the uplink scheduling information may schedule uplink channel (e.g., PUSCH) repetitions, such as the repetitions depicted in FIG. 7. In certain cases, the uplink channel repetitions may be scheduled in at least one full duplex slot, for example, as described herein with respect to FIG. 7.

In step 804, the UE 104 may receive an ULCI indicating to cancel one or more repetitions of the uplink channel repetitions, where the ULCI may leave some of the repetitions scheduled for transmission. The non-canceled repetitions may refer to the repetitions, which are not canceled by the ULCI. As an example, the UE 104 may be schedule to transmit three repetitions in transmission occasions, and the ULCI may indicate to cancel the first repetition in the sequence of three repetitions.

In step 806, the UE 104 may determine whether to take action(s) associated with the non-canceled based at least in part on or more criteria. For example, the UE 104 may determine to refrain from transmitting the non-canceled repetitions or to update the RV associated with the non-canceled repetitions based on the criteria. As repetitions in uplink slots and full duplex slots may have different effective code rates and/or RE allocations, the UE 104 may consider code rates and/or RE allocations associated with the non-canceled repetitions in determining whether to refrain from transmitting the non-canceled repetitions or whether to update the RV associated with the non-canceled repetitions.

At steps 808-814, the UE may take various actions depending on the criteria applied to the non-canceled repetition(s). As an example, the criteria may include the RVs associated with the non-canceled repetitions, the TBS associated with the non-canceled repetitions, the code rate associated with the non-canceled repetitions, and/or the REs associated with the non-canceled repetitions. The UE 104 may determine to transmit the non-canceled repetitions and/or update the RV associated with the non-canceled repetitions if the criteria satisfies certain threshold(s) and/or a performance metric associated with the repetitions.

In some cases, the determination at in step 806 of FIG. 8 may be based at least in part on the REs allocated to the non-canceled repetitions. The UE 104 may determine to refrain from transmitting the non-canceled repetitions or update the RV index associated with each of the non-canceled repetitions based at least in part on the total number of REs allocated to the non-canceled repetitions. For example, the UE 104 may determine to refrain from transmitting the non-canceled repetitions or update the RV index associated with each of the non-canceled repetitions, if the following expression is satisfied:

$$Y < aX \qquad (1)$$

where Y is the number of REs allocated to the non-canceled repetitions, X is the number of REs allocated to all of the repetitions including the canceled and non-canceled repetitions, and a is an adjustment factor. In some cases, the adjustment factor may be based on an effective code rate associated with the repetitions. In certain cases, the adjustment factor may be based on the total number of REs allocated to all of the repetitions (e.g., X).

Figure 9:
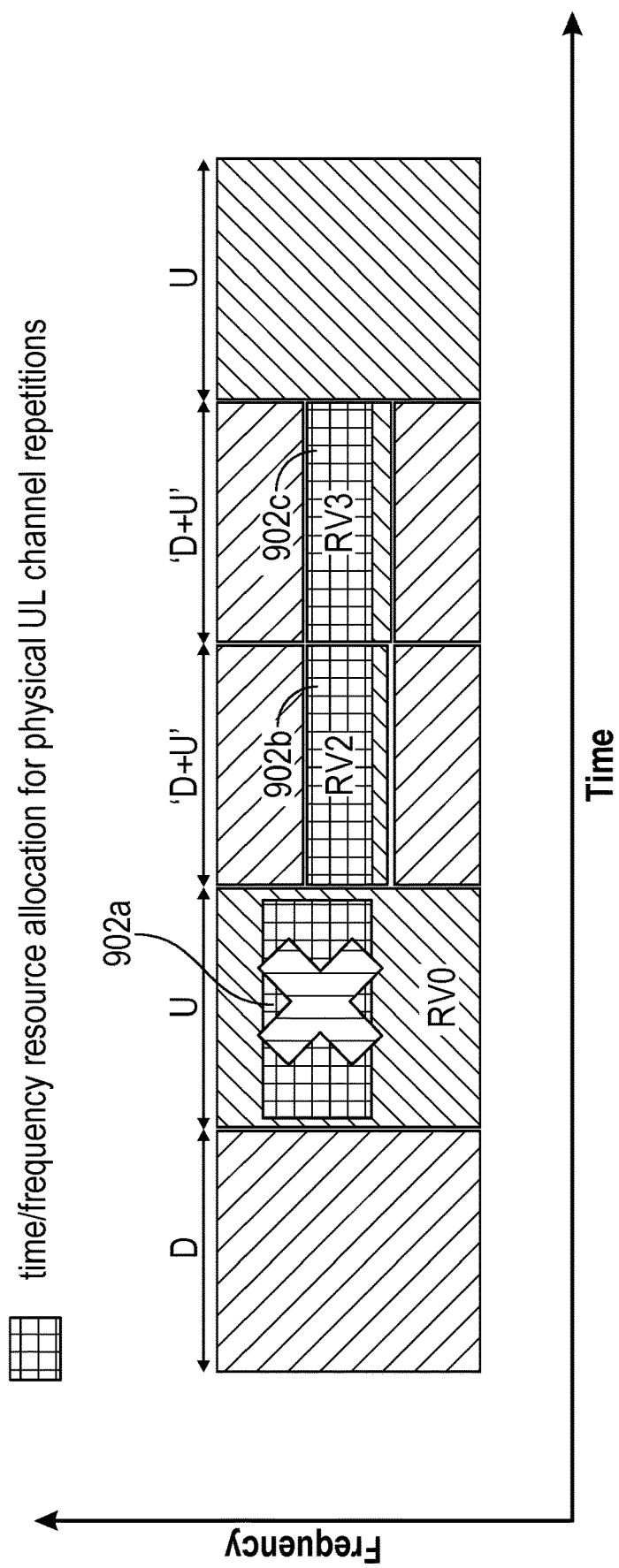
FIG. 9 is a time-frequency diagram illustrating an example uplink repetition cancellation.

FIG. 9 is a time-frequency diagram illustrating an example uplink repetition cancellation. In this example, the UE may be scheduled to transmit three repetitions 902a-c, where the first repetition 902a is canceled, for example, via the ULCI at step 804. The UE may determine whether to take action(s) associated with the non-canceled repetitions 902b, 902c. As an example, at step 808, the UE 104 may determine to refrain from transmitting the non-canceled repetitions 902b, 902c based on the REs allocated to the non-canceled repetitions, for example, according to Expression (1). The UE 104 may determine that the number of REs allocated to the non-canceled repetitions 902b, 902c is less than the total number of REs allocated to all of the repetitions 902a-c adjusted by the adjustment factor, and in response to such a determination, the UE 104 may drop the non-canceled repetitions 902b, 902c from transmission. Alternatively, the UE 104 may determine to update the RV associated with the each of the non-canceled repetitions 902b, 902c to enable transmission of the repetitions 902b, 902c.

In accordance with one or more examples, at step 810, the UE 104 may determine to transmit the non-canceled repetitions 902b, 902c based at least in part on the REs allocated to the non-canceled repetitions, for example, according to Expression (1). The UE 104 may determine that the number of REs allocated to the non-canceled repetitions 902b, 902c is greater than or equal to the total number of REs allocated to all of the repetitions 902a-c adjusted by the adjustment factor, and in response to such a determination, the UE 104 may transmit the non-canceled repetitions 902b, 902c.

Referring to FIG. 8, in certain cases, the determination at step 806 may be based on a performance metric associated with the non-canceled repetitions. The performance metric may depend on the RVs associated with the non-canceled repetitions, the TBS associated with the non-canceled repetitions, the code rate associated with the non-canceled repetitions, and/or the REs associated with the non-canceled repetitions. The performance metric may consider the effective code rate of the non-canceled repetitions and/or the self-decodability of the non-canceled repetitions. The UE 104 may compare the code rate associated with the non-canceled repetitions (e.g., repetitions 902b, 902c) to a target code rate associated with all of the repetitions (e.g., repetitions 902a-c). If the code rate associated with the non-canceled repetitions (e.g., repetitions 902b, 902c) is greater than or equal to the target code rate associated with all of the repetitions (e.g., repetitions 902a-c), the UE 104 may determine to transit the non-canceled repetitions, for example, at step 810. Otherwise, the UE may determine to refrain from transmitting the non-canceled repetitions at step 808 or update the RV associated with each of the non-canceled repetitions at step 810.

In some cases, the UE 104 may consider the self-decodability of the non-canceled repetitions. RVs (e.g., RV0 or RV3) associated with information bits may be considered to have a higher projected performance metric than RVs associated with only parity bits (e.g., RV1 or RV2). If the non-canceled repetitions are self-decodable, the UE 104 may transmit the non-canceled repetitions, for example, at step 810. Otherwise, the UE 104 may refrain from transmitting the non-canceled repetitions, for example, at step 808 or update the RV associated with each of the non-canceled repetitions at step 810, such that the updated RVs are self-decodable.

Referring to FIG. 9, suppose the non-canceled repetitions 902b, 902c have a RV2 and a RV3, respectively. In such a case, the first non-canceled repetition 902b may not be considered self-decodable with a RV2, whereas the second non-canceled repetition 902c may be considered self-decodable with a RV3. The UE may determine to transmit the non-canceled repetitions 902b, 902c at step 810, if there is at least one self-decodable repetition, for example.

Referring to FIG. 8, in some cases, the determination at step 806 may consider if there is only a single non-canceled repetition remaining, for example, as shown at step 812. For a single remaining repetition, the UE may consider the effective code rate of the non-canceled repetition in a full duplex slot after rate matching and/or the RV associated with the non-canceled repetition.

Figure 10A:
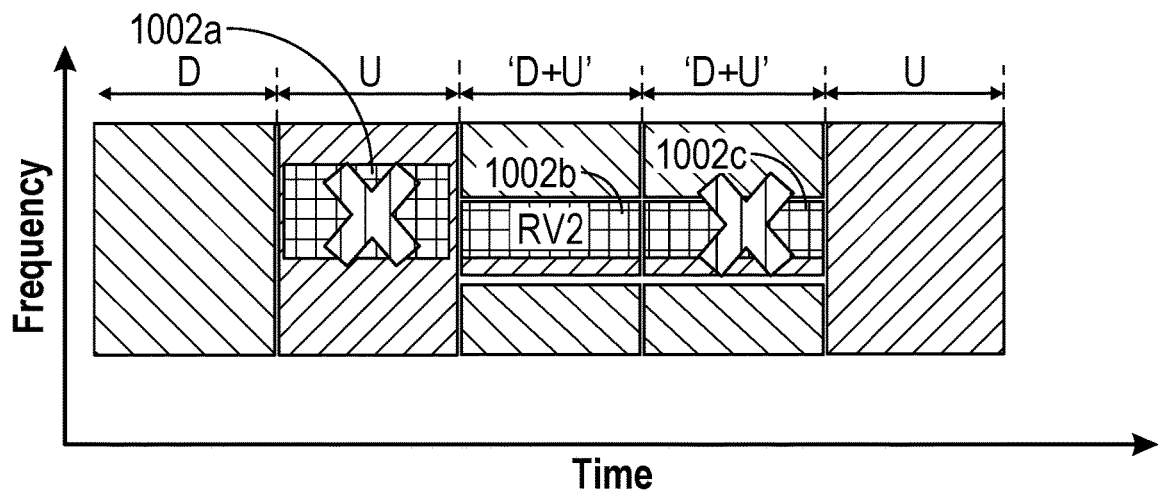
FIGS. 10A and 10B are time-frequency diagrams illustrating examples of uplink repetition cancellation when a single repetition remains.
Figure 10B:
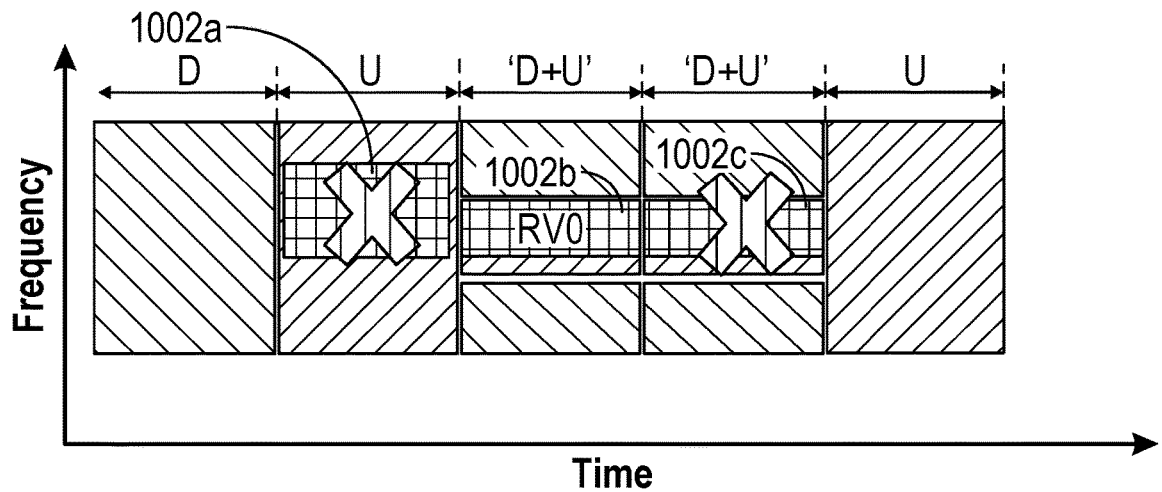

FIGS. 10A and 10B are time-frequency diagrams illustrating examples of uplink repetition cancellation when a single repetition remains. In this example, the UE may be scheduled to transmit three repetitions 1002a-c, where the first repetition 1002a and the third repetition 1002c are canceled, for example, via the ULCI at step 804. The UE may determine whether to take action(s) associated with single remaining the non-canceled repetition 1002b. If there is a single remaining repetition in a full duplex (D+U) slot, the UE 104 may determine to drop the repetition if the RV associated with the non-canceled repetition (e.g., the repetition 1002b) is not self-decodable, such as RV1 or RV2. As shown in FIG. 10A, the non-canceled repetition 1002b has a RV2 in a full duplex slot, and in such a scenario, the UE may determine to refrain from transmitting the non-canceled repetition 1002b.

In certain aspects, the UE may determine to update the RV associated with the non-canceled repetition (e.g., the repetition 1002b) if the RV associated with the non-canceled repetition (e.g., the repetition 1002b) is not self-decodable. For example, suppose the non-canceled repetition 1002b has a RV2. The UE may determine to update the RV to a self-decodable RV, such as RV0 or RV3, for example, as depicted in FIG. 10B and at step 812.

Referring to FIG. 8, in some cases, the determination at step 806 may determine to update the RV sequence associated with the repetitions in response to the cancellation, such as the sequences described herein with respect to Table 1. There could be multiple RV sequences, where each RV sequence may be associated with a certain cancellation. The UE may determine which sequence to use based on the remaining number of repetitions. As an example, the UE 104 may be scheduled with the non-canceled repetition 1002b having a RV2 in a particular RV sequence as shown in FIG. 10A. In response to the ULCI, the UE 104 may select a different RV sequence for the repetitions, such that the non-canceled repetition 1002b has a RV0 as shown in FIG.

10B, and the UE 104 may transmit the non-canceled repetition 1002*b* as depicted at step 812.

Referring to FIG. 8, in certain cases, the determination at step 806 may apply a single RV across the remaining repetitions, for example, as depicted at step 814. The UE may select a single RV (such as RV0 or RV3) to apply across the remaining repetitions.

Figure 11A:
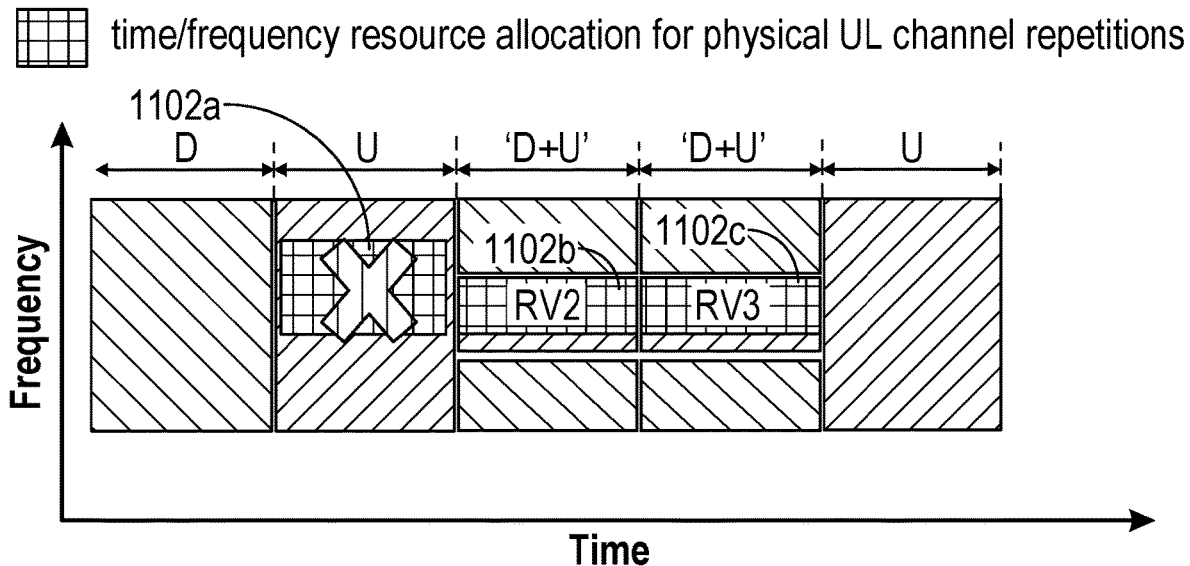
FIGS. 11A and 11B are time-frequency diagrams illustrating an example uplink repetition cancellation when an updated redundancy version is applied to non-canceled repetition(s).
Figure 11B:
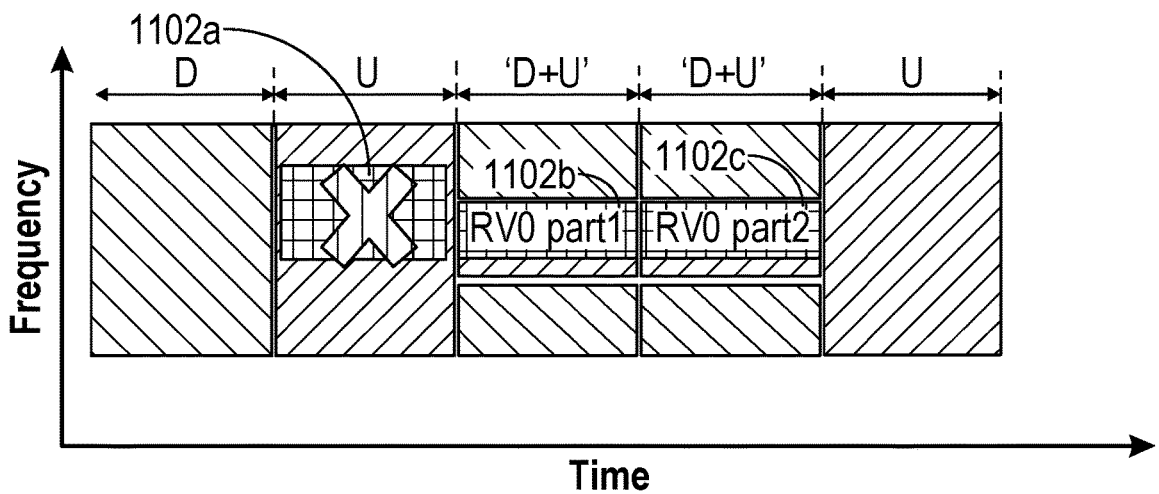

FIGS. 11A and 11B are time-frequency diagrams illustrating an example uplink repetition cancellation when an updated RV is applied to the non-canceled repetition(s). As shown in FIG. 11A, the UE may be scheduled with three repetitions 1102*a-c*, where the first repetition 1102*a* is canceled, and the non-canceled repetitions 1102*b*, 1102*c* have a RV2 and RV3, respectively. Referring to FIG. 11B, the UE may arrange the bits of RV0 across the non-canceled repetitions 1102*b*, 1102*c*, for example, at step 814. The UE may transmit a first portion of the RV0 in the first non-canceled repetition 1102*b* and a second portion of the RV0 in the second non-canceled repetition 1102*c*.

Example Operations of a User Equipment

Figure 12:
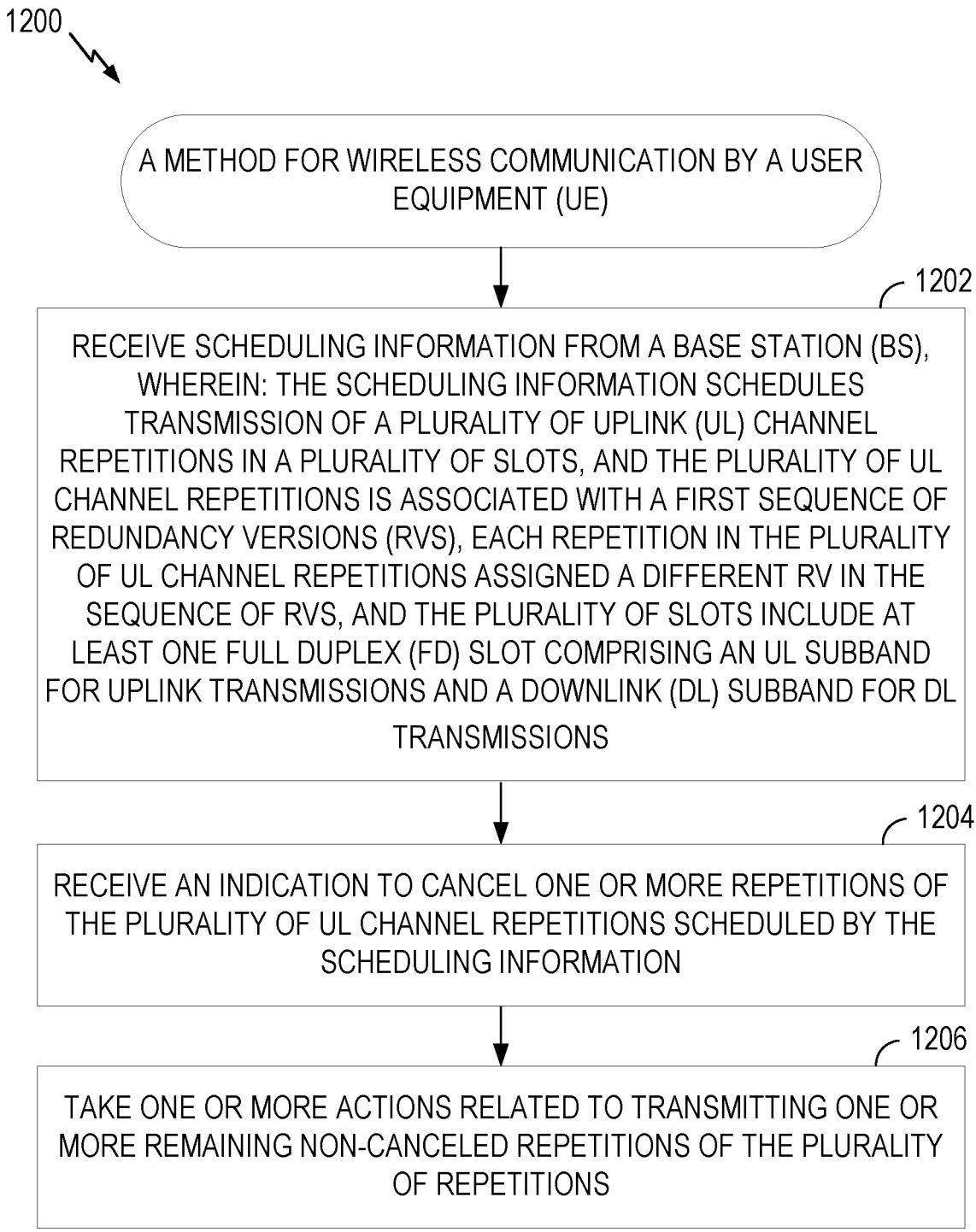
FIG. 12 depicts a method for wireless communication, for example, by a user equipment.

FIG. 12 shows a method 1200 for wireless communication by a UE, such as UE 104 of FIGS. 1 and 3.

Method 1200 optionally begins at block 1202, where the UE may receive scheduling information (e.g., the scheduling information received in step 802 of FIG. 8) from a BS (e.g., the BS 102). The scheduling information may schedule transmission of a plurality of UL channel repetitions in a plurality of slots, for example, as described herein with respect to FIGS. 9-11B. The plurality of UL channel repetitions may be associated with a first sequence of RVs (e.g., a sequence as described herein with respect to Table 1), where each repetition in the plurality of UL channel repetitions may be assigned a different RV in the first sequence of RVs. The plurality of slots may include at least one FD slot comprising an UL subband for uplink transmissions and a DL subband for DL transmissions, for example, as described herein with respect to FIG. 7.

At block 1204, the UE may receive an indication (e.g., the ULCI received in step 804 of FIG. 8) to cancel one or more repetitions of the plurality of UL channel repetitions scheduled by the scheduling information.

At block 1206, the UE may take one or more actions related to transmitting one or more remaining non-canceled repetitions (e.g., the non-canceled repetitions 902*b*, 902*c*) of the plurality of UL channel repetitions, for example, as described herein with respect to step 806 in FIG. 8. The UE may determine whether to transmit the non-canceled repetitions and/or update the RV associated with each of the non-canceled repetitions based on one or more criteria, for example, as described herein with respect to FIGS. 8-11B.

Various aspects relate to the method 1200, including the following aspects. In one aspect, the UE may take one or more actions based on a number of REs allocated to the one or more remaining non-canceled repetitions, for example, as described herein with respect to FIG. 9. The UE may determine whether to transmit the non-canceled repetitions or update the RV associate with each of the non-canceled repetitions based on Expression (1). The UE may transmit the one or more remaining non-canceled repetitions when the number of REs (e.g., Y) allocated to the one or more remaining non-canceled repetitions is greater than or equal to a total number of REs (e.g., X) allocated to all of the plurality of UL channel repetitions adjusted by an adjustment factor (e.g., a). The UE may drop (e.g., refrain from transmitting) the one or more non-canceled repetitions from transmission when the number of REs allocated to the one or more remaining non-canceled repetitions is less than the total number of REs allocated to all of the repetitions of the plurality of UL channel repetitions adjusted by the adjustment factor. The adjustment factor may be based on an effective coding rate associated with the plurality if UL channel repetitions or may be a function of the total number of REs allocated to all of the repetitions of the plurality of UL channel repetitions.

In certain aspects, the UE may take one or more actions based on a projected performance metric for bits across all of the one or more remaining non-canceled repetitions, for example, as described herein with respect to FIG. 9. The UE may determine whether to transmit the non-canceled or update the RV associated with each of the non-canceled repetitions based on the performance metric, such as an effective code rate or self-decodability rate associated with the non-canceled repetitions. The projected performance metric for the bits across all of the one or more remaining non-canceled repetitions may depend on one or more of: one or more RVs (in the first sequence of RVs) assigned to or associated with the one or more remaining non-canceled repetitions, a TBS associated with the one or more remaining non-canceled repetitions, a coding rate associated with the one or more remaining non-canceled repetitions, or a number of REs in the FD slot allocated for the one or more remaining non-canceled repetitions. In certain aspects, RVs (e.g., RV0 or RV3) associated with information bits may have a higher projected performance metric than RVs (e.g., RV1 or RV2) associated with only parity bits.

For certain aspects, the UE may transmit the one or more remaining non-canceled repetitions in the one or more corresponding slots when the decodability rate for the bits across all of the one or more remaining non-canceled repetitions is greater than or equal to a target decodability rate (e.g., a self-decodability rate associated with RV0 or RV3). The UE may drop the one or more non-canceled repetitions from transmission when the decodability rate for the bits across all of the one or more remaining non-canceled repetitions is less than the target decodability rate.

In certain aspects, the UE may consider if there is a single non-canceled repetition remaining, for example, as described herein with respect to FIGS. 10A and 10B. The one or more remaining non-canceled repetitions may include only one remaining non-canceled repetition scheduled to occur in the at least one FD slot. The UE may drop the one remaining non-canceled repetition from being transmitted in the at least one FD slot when the one remaining non-canceled repetition is assigned an RV in the first sequence of RVs that is associated with only parity bits (e.g., RV1 or RV2). When the one remaining non-canceled repetition is assigned an RV in the first sequence of RVs that is associated with only parity bits, the UE may update the RV of the one remaining non-canceled repetition to be an RV in the first sequence of RVs that is associated with information bits (e.g., RV0 or RV3), for example, as described herein with respect to FIG. 10B. The UE may transmit the one remaining non-canceled repetition in the FD slot based on the updated RV that is associated with information bits.

For certain aspects, the UE may update the first sequence of RVs in response to the ULCI, for example, as described herein with respect to FIGS. 10A and 10B. Based on the indication to cancel one or more repetitions, the UE may update the first sequence of RVs (e.g., the RV sequence associated with $rv_{id}=2$ in Table 1) to a second sequence of RVs (e.g., the RV sequence associated with $rv_{id}=0$ in Table 1) for the one or more remaining non-canceled repetitions.

To take one or more actions, the UE may transmit the one or more remaining non-canceled repetitions based on the updated second sequence of RVs. In certain cases, the UE may select the second sequence of RVs from a plurality of RVs based on a number of repetitions in the one or more remaining non-canceled repetitions. The UE may be configured with RV sequences associated with a certain cancellation scenario, such as the number of non-canceled repetitions. The RVs in the second sequence of RVs may be different for different numbers of repetitions in the one or more remaining non-canceled repetitions. In some cases, the second sequence of RVs may include only RVs associated with information bits when the number of repetitions in the one or more remaining non-canceled repetitions is less than or equal to a threshold number.

In certain aspects, the UE may apply a single RV across the remaining repetitions, for example, as described herein with respect to FIGS. 11A and 11B. Based on the indication to cancel one or more repetitions and to one or more actions, the UE may use one RV to transmit the one or more remaining non-canceled repetitions.

Figure 14:
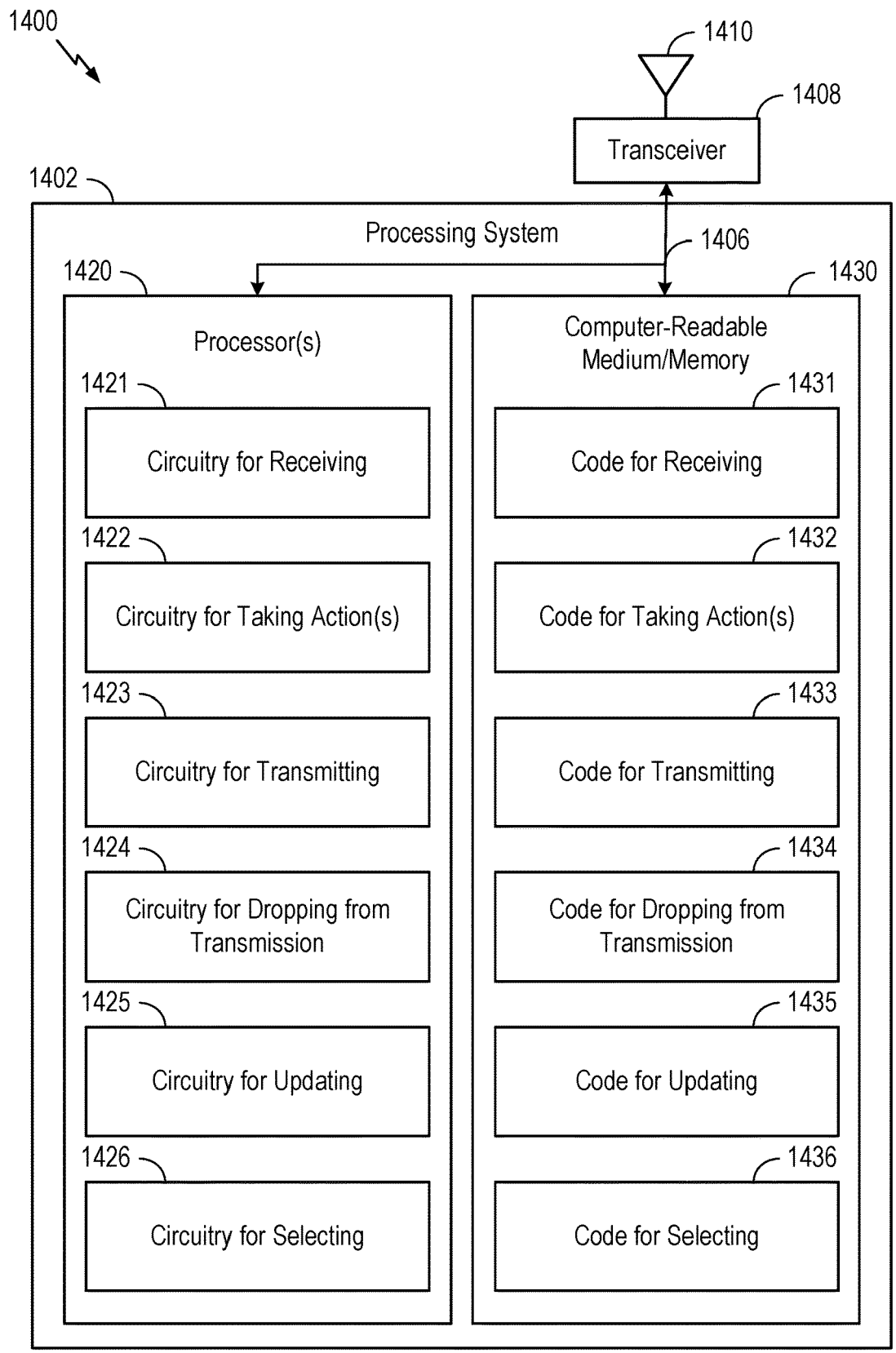
FIG. 14 depicts aspects of an example communications device.

In one aspect, method 1200, or any aspect related to it, may be performed by an apparatus, such as communications device 1400 of FIG. 14, which includes various components operable, configured, or adapted to perform the method 1200. The communications device 1400 is described below in further detail.

Note that FIG. 12 is an example of a method, and other methods including fewer, additional, or alternative steps are possible consistent with this disclosure.

Example Operations of a Network Entity

Figure 13:
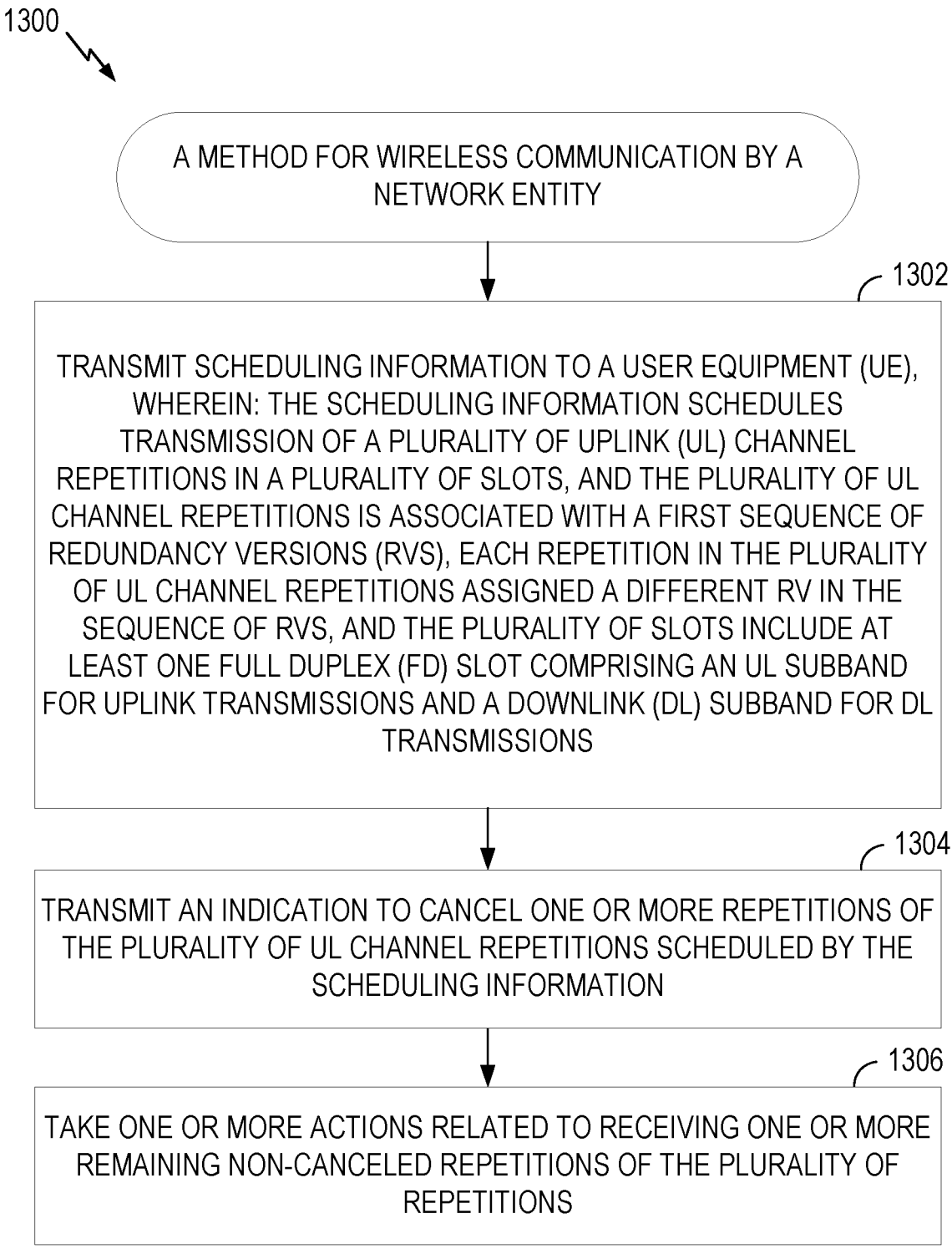
FIG. 13 depicts a method for wireless communication, for example, by a network entity.

FIG. 13 shows a method 1300 for wireless communication by a network entity, such as BS 102 of FIGS. 1 and 3, or a disaggregated base station as discussed with respect to FIG. 2.

Method 1300 may optionally begin at block 1302 where the network entity may transmit scheduling information to a UE. The scheduling information may schedule transmission of a plurality of UL channel repetitions in a plurality of slots, for example, as described herein with respect to FIGS. 9-11B. As described herein with respect to FIG. 12, the plurality of UL channel repetitions may be associated with a first sequence of RVs (e.g., an RV sequence in Table 1), and each repetition in the plurality of UL channel repetitions may be assigned a different RV in the first sequence of RVs. The plurality of slots may include at least one FD slot comprising an UL subband for uplink transmissions and a DL subband for DL transmissions.

At block 1304, the network entity may transmit, to the UE, an indication (e.g., the ULCI transmitted in step 804 of FIG. 8) to cancel one or more repetitions of the plurality of UL channel repetitions scheduled by the scheduling information.

At block 1306, the network entity may take one or more actions related to receiving one or more remaining non-canceled repetitions of the plurality of UL channel repetitions. The network entity may determine whether to receive the non-canceled repetitions and/or expect an updated RV associated with each of the non-canceled repetitions based on one or more criteria, for example, as described herein with respect to FIGS. 8-11B.

Various aspects relate to the method 1300, including the following aspects. In one aspect, the network entity may take one or more actions based on a number of REs allocated to the one or more remaining non-canceled repetitions, for example, as described herein with respect to FIG. 9. The network entity may determine whether to receive the non-canceled repetitions or expect an updated RV associate with each of the non-canceled repetitions based on Expression (1), for example. The network entity may receive the one or more remaining non-canceled repetitions when the number of REs allocated to the one or more remaining non-canceled repetitions is greater than or equal to a total number of REs allocated to all of the plurality of UL channel repetitions adjusted by an adjustment factor. The network entity may drop the one or more non-canceled repetitions from reception when the number of REs allocated to the one or more remaining non-canceled repetitions is less than the total number of REs allocated to all of the repetitions of the plurality of UL channel repetitions adjusted by the adjustment factor. The network entity may apply the adjustment factor as described herein. Dropping the non-canceled repetitions from reception may enable the network entity to receive other transmissions. For example, if the network entity determines to drop a repetition from reception, the network entity may schedule other transmission(s) in the resources assigned from the dropped repetitions.

In certain aspects, the network entity may take one or more actions based on a projected performance metric for bits across all of the one or more remaining non-canceled repetitions, for example, as described herein with respect to FIG. 9. The network entity may determine whether to receive the non-canceled or expect an updated RV associated with each of the non-canceled repetitions based on the performance metric, such as an effective code rate or self-decodability rate associated with the non-canceled repetitions. The projected performance metric for the bits across all of the one or more remaining non-canceled repetitions may depend on the one or more aspects, such as an RV, TBS, code rate, and/or REs, described herein with respect to FIG. 12. RVs associated with information bits may have a higher projected performance metric than RVs associated with only parity bits.

The network entity may receive the one or more remaining non-canceled repetitions in the one or more corresponding slots when the decodeability rate for the bits across all of the one or more remaining non-canceled repetitions is greater than or equal to a target decodeability rate. The network entity may drop the one or more non-canceled repetitions from reception when the decodeability rate for the bits across all of the one or more remaining non-canceled repetitions is less than the target decodeability rate.

In certain aspects, the network entity may consider if there is a single non-canceled repetition remaining, for example, as described herein with respect to FIGS. 10A and 10B. The one or more remaining non-canceled repetitions may include only one remaining non-canceled repetition scheduled to occur in the at least one FD slot. The network entity may drop the one remaining non-canceled repetition from being received in the at least one FD slot when the one remaining non-canceled repetition is assigned an RV in the first sequence of RVs that is associated with only parity bits (e.g., RV1 or RV2). When the one remaining non-canceled repetition is assigned an RV in the first sequence of RVs that is associated with only parity bits, the network entity may receive the one remaining non-canceled repetition in the FD slot based on an updated RV that is associated with information bits (e.g., RV0 or RV3).

For certain aspects, the network entity may expect to receive the non-canceled repetitions with an updated sequence of RVs in response to the ULCI, for example, as described herein with respect to FIGS. 10A and 10B. To take one or more actions, the network entity may receive the one or more remaining non-canceled repetitions based on a second sequence of RVs. The RVs in the second sequence of RVs may be different for different numbers of repetitions in the one or more remaining non-canceled repetitions. In certain cases, the second sequence of RVs may include only RVs associated with information bits (e.g., RV0 and/or RV3) when the number of repetitions in the one or more remaining non-canceled repetitions is less than or equal to a threshold number.

In certain aspects, the network entity may expect to receive a single RV across the remaining repetitions, for example, as described herein with respect to FIGS. 11A and 11B. To take one or more actions, the network entity may receive one RV across the one or more remaining non-canceled repetitions.

Figure 15:
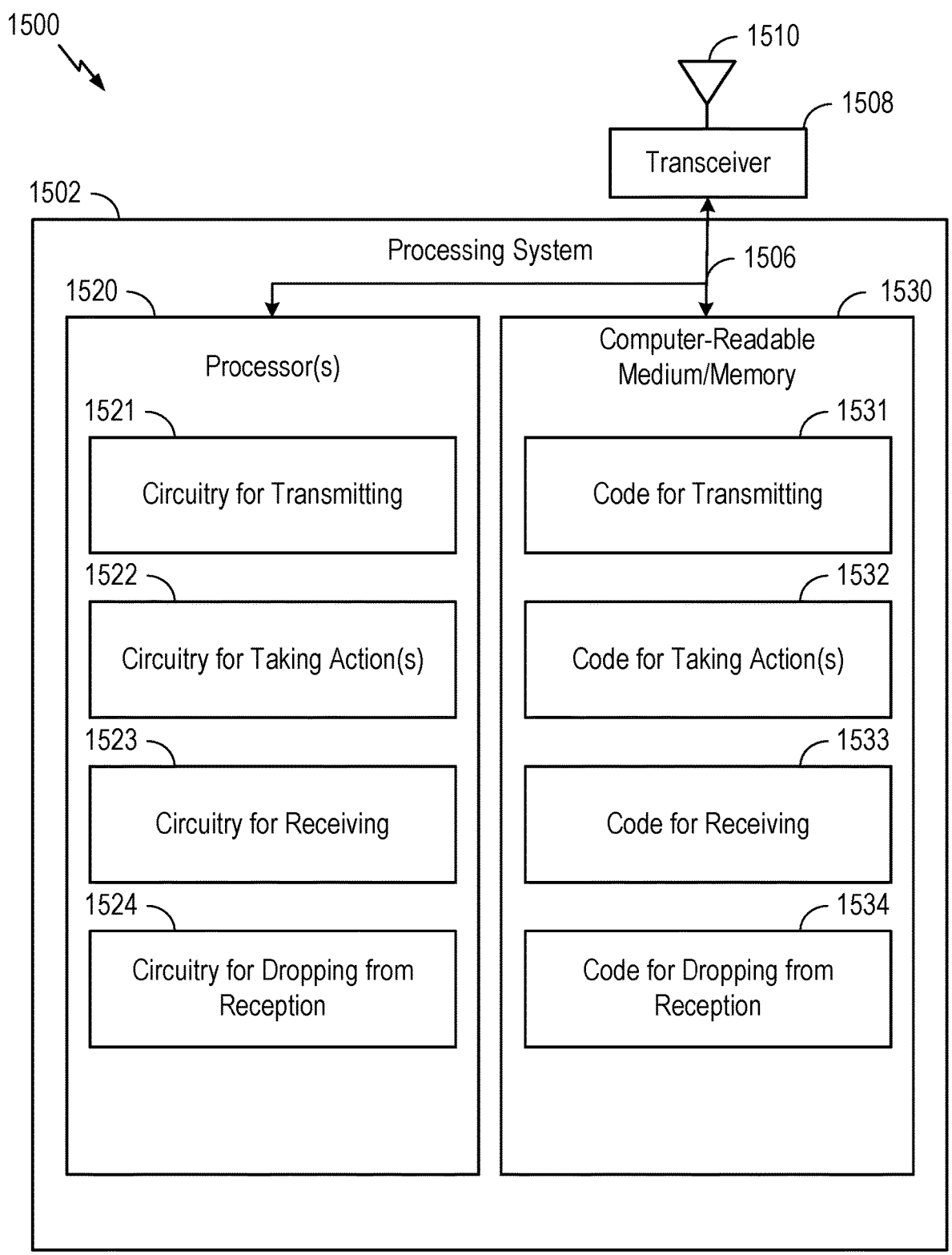
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. The communications device 1500 is described below in further detail.

Note that FIG. 13 is an example of a method, and other methods including fewer, additional, or alternative steps are possible consistent with this disclosure.

Example Communications Devices

FIG. 14 depicts aspects of an example communications device 1400. In some aspects, communications device 1400 is a user equipment, such as UE 104 described above with respect to FIGS. 1 and 3.

The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes one or more processors 1420. In various aspects, the one or more processors 1420 may be representative of one or more of receive processor 358, transmit processor 364, TX MIMO processor 366, and/or controller/processor 380, as described with respect to FIG. 3. The one or more processors 1420 are coupled to a computer-readable medium/memory 1430 via a bus 1406. In certain aspects, the computer-readable medium/memory 1430 is configured to store instructions (e.g., computer-executable code) that when executed by the one or more processors 1420, cause the one or more processors 1420 to perform the method 1200 described with respect to FIG. 12, or any aspect related to it. Note that reference to a processor performing a function of communications device 1400 may include one or more processors performing that function of communications device 1400.

In the depicted example, computer-readable medium/memory 1430 stores code (e.g., executable instructions) for receiving 1431, code for taking action(s) 1432, code for transmitting 1433, code for dropping from transmission 1434, code for updating 1435, and/or code for selecting 1436. Processing of any of the code 1431-1436 may cause the communications device 1400 to perform the method 1200 described with respect to FIG. 12, or any aspect related to it.

The one or more processors 1420 include circuitry configured to implement (e.g., execute) the code stored in the computer-readable medium/memory 1430, including circuitry for receiving 1421, circuitry for taking action(s) 1422, circuitry for transmitting 1423, circuitry for dropping from transmission 1424, circuitry for updating 1425, and/o circuitry for selecting 1426. Processing with any of circuitry 1421-1426 may cause the communications device 1400 to perform the method 1200 described with respect to FIG. 12, or any aspect related to it.

Various components of the communications device 1400 may provide means for performing the method 1200 described with respect to FIG. 12, or any aspect related to it. For example, means for transmitting, sending or outputting for transmission may include the transceivers 354 and/or antenna(s) 352 of the UE 104 illustrated in FIG. 3 and/or transceiver 1408 and antenna 1410 of the communications device 1400 in FIG. 14. Means for receiving or obtaining may include the transceivers 354 and/or antenna(s) 352 of the UE 104 illustrated in FIG. 3 and/or transceiver 1408 and antenna 1410 of the communications device 1400 in FIG. 14.

FIG. 15 depicts aspects of an example communications device. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes one or more processors 1520. In various aspects, one or more processors 1520 may be representative of one or more of receive processor 338, transmit processor 320, TX MIMO processor 330, and/or controller/processor 340, as described with respect to FIG. 3. The one or more processors 1520 are coupled to a computer-readable medium/memory 1530 via a bus 1506. In certain aspects, the computer-readable medium/memory 1530 is configured to store instructions (e.g., computer-executable code) that when executed by the one or more processors 1520, cause the one or more processors 1520 to perform the method 1300 described with respect to FIG. 13, or any aspect related to it. Note that reference to a processor of communications device 1500 performing a function may include one or more processors of communications device 1500 performing that function.

In the depicted example, the computer-readable medium/memory 1530 stores code (e.g., executable instructions) for transmitting 1531, code for taking action(s) 1532, code for receiving 1533, and/or code for dropping from reception 1534. Processing of any of the code 1531-1534 may cause the communications device 1500 to perform the method 1300 described with respect to FIG. 13, or any aspect related to it.

The one or more processors 1520 include circuitry configured to implement (e.g., execute) the code stored in the computer-readable medium/memory 1530, including circuitry for transmitting 1521, circuitry for taking action(s) 1522, circuitry for receiving 1523, and/or circuitry for dropping from reception 1524. Processing with any of circuitry 1521-1524 may cause the communications device 1500 to perform the method 1300 as described with respect to FIG. 13, or any aspect related to it.

Various components of the communications device 1500 may provide means for performing the method 1300 as described with respect to FIG. 13, or any aspect related to it. Means for transmitting, sending or outputting for transmission may include the transceivers 332 and/or antenna(s) 334 of the BS 102 illustrated in FIG. 3 and/or transceiver 1508 and antenna 1510 of the communications device 1500 in FIG. 15. Means for receiving or obtaining may include the transceivers 332 and/or antenna(s) 334 of the BS 102 illustrated in FIG. 3 and/or transceiver 1508 and antenna 1510 of the communications device 1500 in FIG. 15.

Example Clauses

Implementation examples are described in the following numbered clauses:

Clause 1: A method for wireless communication by a user equipment (UE), comprising: receiving scheduling information from a network entity, wherein: the scheduling information schedules transmission of a plurality of uplink (UL) channel repetitions in a plurality of slots, the plurality of UL channel repetitions is associated with a first sequence of redundancy versions (RVs), each repetition in the plurality of UL channel repetitions assigned a different RV in the first sequence of RVs, and the plurality of slots include at least one full duplex (FD) slot comprising an UL subband for uplink transmissions and a downlink (DL) subband for DL transmissions; receiving an indication to cancel one or more repetitions of the plurality of UL channel repetitions scheduled by the scheduling information; and taking one or more actions related to transmitting one or more remaining non-canceled repetitions of the plurality of UL channel repetitions.

Clause 2: The method of Clause 1, wherein taking the one or more actions is based on a number of resource elements (REs) allocated to the one or more remaining non-canceled repetitions.

Clause 3: The method of Clause 2, wherein taking the one or more actions comprises one of: transmitting the one or more remaining non-canceled repetitions when the number of REs allocated to the one or more remaining non-canceled repetitions is greater than or equal to a total number of REs allocated to all of the plurality of UL channel repetitions adjusted by an adjustment factor, and dropping the one or more non-canceled repetitions from transmission when the number of REs allocated to the one or more remaining non-canceled repetitions is less than the total number of REs allocated to all of the repetitions of the plurality of UL channel repetitions adjusted by the adjustment factor.

Clause 4: The method of Clause 3, wherein the adjustment factor is based on an effective coding rate associated with the plurality if UL channel repetitions or is a function of the total number of REs allocated to all of the repetitions of the plurality of UL channel repetitions.

Clause 5: The method according to any of Clauses 1-4, wherein taking the one or more actions is based on a projected performance metric for bits across all of the one or more remaining non-canceled repetitions.

Clause 6: The method of Clause 5, wherein the projected performance metric for the bits across all of the one or more remaining non-canceled repetitions depends on one or more of: one or more RVs associated with the one or more remaining non-canceled repetitions, a transport block size (TBS) associated with the one or more remaining non-canceled repetitions, a coding rate associated with the one or more remaining non-canceled repetitions, or a number of resources elements (REs) in the FD slot allocated for the one or more remaining non-canceled repetitions.

Clause 7: The method of Clause 6, wherein RVs associated with information bits have a higher projected performance metric than RVs associated with only parity bits.

Clause 8: The method according to any of Clauses 5-7, wherein taking the one or more actions comprises one of: transmitting the one or more remaining non-canceled repetitions in the one or more corresponding slots when a decodability rate for the bits across all of the one or more remaining non-canceled repetitions is greater than or equal to a target decodability rate, and dropping the one or more non-canceled repetitions from transmission when the decodability rate for the bits across all of the one or more remaining non-canceled repetitions is less than the target decodability rate.

Clause 9: The method according to any of Clauses 1-8, wherein: the one or more remaining non-canceled repetitions comprises only one remaining non-canceled repetition scheduled to occur in the at least one FD slot, and one of: dropping the one remaining non-canceled repetition from being transmitted in the at least one FD slot when the one remaining non-canceled repetition is assigned an RV in the first sequence of RVs that is associated with only parity bits, or when the one remaining non-canceled repetition is assigned an RV in the first sequence of RVs that is associated with only parity bits: updating the RV of the one remaining non-canceled repetition to be an RV in the first sequence of RVs that is associated with information bits, and transmitting the one remaining non-canceled repetition in the FD slot based on the updated RV that is associated with information bits.

Clause 10: The method of Clause 1, further comprising, based on the indication to cancel one or more repetitions, updating the first sequence of RVs to a second sequence of RVs for the one or more remaining non-canceled repetitions, wherein taking the one or more actions comprises transmitting the one or more remaining non-canceled repetitions based on the updated second sequence of RVs.

Clause 11: The method of Clause 10, further comprising selecting the second sequence of RVs from a plurality of RVs based on a number of repetitions in the one or more remaining non-canceled repetitions, wherein RVs in the second sequence of RVs are different for different numbers of repetitions in the one or more remaining non-canceled repetitions.

Clause 12: The method of Clause 10 or 11, wherein the second sequence of RVs includes only RVs associated with information bits when the number of repetitions in the one or more remaining non-canceled repetitions is less than or equal to a threshold number.

Clause 13: The method of Clause 1, wherein, based on the indication to cancel one or more repetitions, taking the one or more actions comprises using one RV to transmit the one or more remaining non-canceled repetitions.

Clause 14: A method for wireless communication by a network entity, comprising: transmitting scheduling information to a user equipment (UE), wherein: the scheduling information schedules transmission of a plurality of uplink (UL) channel repetitions in a plurality of slots, the plurality of UL channel repetitions is associated with a first sequence of redundancy versions (RVs), each repetition in the plurality of UL channel repetitions assigned a different RV in the first sequence of RVs, and the plurality of slots include at least one full duplex (FD) slot comprising an UL subband for uplink transmissions and a downlink (DL) subband for DL transmissions; transmitting, to the UE, an indication to cancel one or more repetitions of the plurality of UL channel repetitions scheduled by the scheduling information; and taking one or more actions related to receiving one or more remaining non-canceled repetitions of the plurality of UL channel repetitions.

Clause 15: The method of Clause 14, wherein taking the one or more actions is based on a number of resource elements (REs) allocated to the one or more remaining non-canceled repetitions.

Clause 16: The method of Clause 15, wherein taking the one or more actions comprises one of: receiving the one or more remaining non-canceled repetitions when the number of REs allocated to the one or more remaining non-canceled repetitions is greater than or equal to a total number of REs allocated to all of the plurality of UL channel repetitions adjusted by an adjustment factor, and dropping the one or more non-canceled repetitions from reception when the number of REs allocated to the one or more remaining non-canceled repetitions is less than the total number of REs allocated to all of the repetitions of the plurality of UL channel repetitions adjusted by the adjustment factor.

Clause 17: The method of Clause 16, wherein the adjustment factor is based on an effective coding rate associated with the plurality if UL channel repetitions or is a function of the total number of REs allocated to all of the repetitions of the plurality of UL channel repetitions.

Clause 18: The method according to any of Clauses 14-17, wherein taking the one or more actions is based on a projected performance metric for bits across all of the one or more remaining non-canceled repetitions.

Clause 19: The method of Clause 18, wherein the projected performance metric for the bits across all of the one or more remaining non-canceled repetitions depends on one or more of: one or more RVs associated with the one or more remaining non-canceled repetitions, a transport block size (TBS) associated with the one or more remaining non-canceled repetitions, a coding rate associated with the one or more remaining non-canceled repetitions, or a number of resources elements (REs) in the FD slot allocated for the one or more remaining non-canceled repetitions.

Clause 20: The method of Clause 19, wherein RVs associated with information bits have a higher projected performance metric than RVs associated with only parity bits.

Clause 21: The method according to any of Clauses 18-20, wherein taking the one or more actions comprises one of: receiving the one or more remaining non-canceled repetitions in the one or more corresponding slots when a decodability rate for the bits across all of the one or more remaining non-canceled repetitions is greater than or equal to a target decodability rate, and dropping the one or more non-canceled repetitions from reception when the decodability rate for the bits across all of the one or more remaining non-canceled repetitions is less than the target decodability rate.

Clause 22: The method according to any of Clauses 14-21, wherein: the one or more remaining non-canceled repetitions comprises only one remaining non-canceled repetition scheduled to occur in the at least one FD slot, and one of: dropping the one remaining non-canceled repetition from being received in the at least one FD slot when the one remaining non-canceled repetition is assigned an RV in the first sequence of RVs that is associated with only parity bits, or when the one remaining non-canceled repetition is assigned an RV in the first sequence of RVs that is associated with only parity bits: receiving the one remaining non-canceled repetition in the FD slot based on an updated RV that is associated with information bits.

Clause 23: The method of Clause 14, wherein taking the one or more actions comprises receiving the one or more remaining non-canceled repetitions based on a second sequence of RVs.

Clause 24: The method of Clause 23, wherein RVs in the second sequence of RVs are different for different numbers of repetitions in the one or more remaining non-canceled repetitions.

Clause 25: The method of Clause 23 or 24, wherein the second sequence of RVs includes only RVs associated with information bits when the number of repetitions in the one or more remaining non-canceled repetitions is less than or equal to a threshold number.

Clause 26: The method of Clause 14, wherein, taking the one or more actions comprises receiving one RV across the one or more remaining non-canceled repetitions.

Clause 27: An apparatus, comprising: a memory comprising executable instructions; and a processor configured to execute the executable instructions and cause the apparatus to perform a method in accordance with any of Clauses 1-26.

Clause 28: An apparatus, comprising means for performing a method in accordance with any of Clauses 1-26.

Clause 29: A non-transitory computer-readable medium comprising executable instructions that, when executed by a processor of an apparatus, cause the apparatus to perform a method in accordance with any of Clauses 1-26.

Clause 30: A computer program product embodied on a computer-readable storage medium comprising code for performing a method in accordance with any of Clauses 1-26.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment (UE), comprising:
   receiving scheduling information from a network entity, wherein:
      the scheduling information schedules transmission of a plurality of uplink (UL) channel repetitions in a plurality of slots,
      the plurality of UL channel repetitions is associated with a first sequence of redundancy versions (RVs), each repetition in the plurality of UL channel repetitions assigned a different RV in the first sequence of RVs, and
      the plurality of slots include at least one full duplex (FD) slot, wherein the at least one FD slot comprises an UL subband for uplink transmissions and a downlink (DL) subband for DL transmissions within the same slot;
   receiving an indication to cancel one or more repetitions of the plurality of UL channel repetitions scheduled by the scheduling information; and
   taking one or more actions related to transmitting one or more remaining non-canceled repetitions of the plurality of UL channel repetitions.

2. The method of claim 1, wherein taking the one or more actions is based on a number of resource elements (REs) allocated to the one or more remaining non-canceled repetitions.

3. The method of claim 2, wherein taking the one or more actions comprises one of:
   transmitting the one or more remaining non-canceled repetitions when the number of REs allocated to the one or more remaining non-canceled repetitions is greater than or equal to a total number of REs allocated to all of the plurality of UL channel repetitions adjusted by an adjustment factor, and
   dropping the one or more non-canceled repetitions from transmission when the number of REs allocated to the one or more remaining non-canceled repetitions is less than the total number of REs allocated to all of the repetitions of the plurality of UL channel repetitions adjusted by the adjustment factor.

4. The method of claim 3, wherein the adjustment factor is based on an effective coding rate associated with the plurality if UL channel repetitions or is a function of the total number of REs allocated to all of the repetitions of the plurality of UL channel repetitions.

5. The method of claim 1, wherein taking the one or more actions is based on a projected performance metric for bits across all of the one or more remaining non-canceled repetitions.

6. The method of claim 5, wherein the projected performance metric for the bits across all of the one or more remaining non-canceled repetitions depends on one or more of:
   one or more RVs associated with the one or more remaining non-canceled repetitions,
   a transport block size (TBS) associated with the one or more remaining non-canceled repetitions,
   a coding rate associated with the one or more remaining non-canceled repetitions, or
   a number of resources elements (REs) in the FD slot allocated for the one or more remaining non-canceled repetitions.

7. The method of claim 6, wherein RVs associated with information bits have a higher projected performance metric than RVs associated with only parity bits.

8. The method of claim 5, wherein taking the one or more actions comprises one of:
   transmitting the one or more remaining non-canceled repetitions in the one or more corresponding slots when a decodability rate for the bits across all of the one or more remaining non-canceled repetitions is greater than or equal to a target decodability rate, and
   dropping the one or more non-canceled repetitions from transmission when the decodability rate for the bits across all of the one or more remaining non-canceled repetitions is less than the target decodability rate.

9. The method of claim 1, wherein:
the one or more remaining non-canceled repetitions comprises only one remaining non-canceled repetition scheduled to occur in the at least one FD slot, and wherein taking the one or more actions comprises one of:
dropping the one remaining non-canceled repetition from being transmitted in the at least one FD slot when the one remaining non-canceled repetition is assigned an RV in the first sequence of RVs that is associated with only parity bits, or
when the one remaining non-canceled repetition is assigned an RV in the first sequence of RVs that is associated with only parity bits:
updating the RV of the one remaining non-canceled repetition to be an RV in the first sequence of RVs that is associated with information bits, and
transmitting the one remaining non-canceled repetition in the FD slot based on the updated RV that is associated with information bits.

10. The method of claim 1, further comprising, based on the indication to cancel one or more repetitions, updating the first sequence of RVs to a second sequence of RVs for the one or more remaining non-canceled repetitions, wherein taking the one or more actions comprises transmitting the one or more remaining non-canceled repetitions based on the updated second sequence of RVs.

11. The method of claim 10, further comprising selecting the second sequence of RVs from a plurality of RVs based on a number of repetitions in the one or more remaining non-canceled repetitions, wherein RVs in the second sequence of RVs are different for different numbers of repetitions in the one or more remaining non-canceled repetitions.

12. The method of claim 11, wherein the second sequence of RVs includes only RVs associated with information bits when the number of repetitions in the one or more remaining non-canceled repetitions is less than or equal to a threshold number.

13. The method of claim 1, wherein, based on the indication to cancel one or more repetitions, taking the one or more actions comprises using one RV to transmit the one or more remaining non-canceled repetitions.

14. A method for wireless communication by a network entity, comprising:
transmitting scheduling information to a user equipment (UE), wherein:
the scheduling information schedules transmission of a plurality of uplink (UL) channel repetitions in a plurality of slots,
the plurality of UL channel repetitions is associated with a first sequence of redundancy versions (RVs), each repetition in the plurality of UL channel repetitions assigned a different RV in the first sequence of RVs, and
the plurality of slots include at least one full duplex (FD) slot, wherein the at least one FD slot comprises an UL subband for uplink transmissions and a downlink (DL) subband for DL transmissions within the same slot;
transmitting, to the UE, an indication to cancel one or more repetitions of the plurality of UL channel repetitions scheduled by the scheduling information; and
taking one or more actions related to receiving one or more remaining non-canceled repetitions of the plurality of UL channel repetitions.

15. The method of claim 14, wherein taking the one or more actions is based on a number of resource elements (REs) allocated to the one or more remaining non-canceled repetitions.

16. The method of claim 15, wherein taking the one or more actions comprises one of:
receiving the one or more remaining non-canceled repetitions when the number of REs allocated to the one or more remaining non-canceled repetitions is greater than or equal to a total number of REs allocated to all of the plurality of UL channel repetitions adjusted by an adjustment factor, and
dropping the one or more non-canceled repetitions from reception when the number of REs allocated to the one or more remaining non-canceled repetitions is less than the total number of REs allocated to all of the repetitions of the plurality of UL channel repetitions adjusted by the adjustment factor.

17. The method of claim 16, wherein the adjustment factor is based on an effective coding rate associated with the plurality if UL channel repetitions or is a function of the total number of REs allocated to all of the repetitions of the plurality of UL channel repetitions.

18. The method of claim 14, wherein taking the one or more actions is based on a projected performance metric for bits across all of the one or more remaining non-canceled repetitions.

19. The method of claim 18, wherein the projected performance metric for the bits across all of the one or more remaining non-canceled repetitions depends on one or more of:
one or more RVs associated with the one or more remaining non-canceled repetitions,
a transport block size (TBS) associated with the one or more remaining non-canceled repetitions,
a coding rate associated with the one or more remaining non-canceled repetitions, or
a number of resources elements (REs) in the FD slot allocated for the one or more remaining non-canceled repetitions.

20. The method of claim 19, wherein RVs associated with information bits have a higher projected performance metric than RVs associated with only parity bits.

21. The method of claim 18, wherein taking the one or more actions comprises one of:
receiving the one or more remaining non-canceled repetitions in the one or more corresponding slots when a decodability rate for the bits across all of the one or more remaining non-canceled repetitions is greater than or equal to a target decodability rate, and
dropping the one or more non-canceled repetitions from reception when the decodability rate for the bits across all of the one or more remaining non-canceled repetitions is less than the target decodability rate.

22. The method of claim 14, wherein:
the one or more remaining non-canceled repetitions comprises only one remaining non-canceled repetition scheduled to occur in the at least one FD slot, and wherein taking the one or more actions comprises,
when the one remaining non-canceled repetition is assigned an RV in the first sequence of RVs that is associated with only parity bits,
receiving the one remaining non-canceled repetition in the FD slot based on an updated RV that is associated with information bits.

23. The method of claim 14, wherein taking the one or more actions comprises receiving the one or more remaining non-canceled repetitions based on a second sequence of RVs.

24. The method of claim 23, wherein RVs in the second sequence of RVs are different for different numbers of repetitions in the one or more remaining non-canceled repetitions.

25. The method of claim 24, wherein the second sequence of RVs includes only RVs associated with information bits when the number of repetitions in the one or more remaining non-canceled repetitions is less than or equal to a threshold number.

26. The method of claim 14, wherein, taking the one or more actions comprises receiving one RV across the one or more remaining non-canceled repetitions.

27. An apparatus, comprising:
one or more memories comprising executable instructions; and
one or more processors configured to execute the executable instructions and cause the apparatus to:
receive scheduling information from a network entity, wherein:
the scheduling information schedules transmission of a plurality of uplink (UL) channel repetitions in a plurality of slots,
the plurality of UL channel repetitions is associated with a first sequence of redundancy versions (RVs), each repetition in the plurality of UL channel repetitions assigned a different RV in the first sequence of RVs, and
the plurality of slots include at least one full duplex (FD) slot, wherein the at least one FD slot comprises an UL subband for uplink transmissions and a downlink (DL) subband for DL transmissions within the same slot;
receive an indication to cancel one or more repetitions of the plurality of UL channel repetitions scheduled by the scheduling information; and
take one or more actions related to transmitting one or more remaining non-canceled repetitions of the plurality of repetitions.

28. An apparatus, comprising:
one or more memories comprising executable instructions; and
one or more processors configured to execute the executable instructions and cause the apparatus to:
transmit scheduling information to a user equipment (UE), wherein:
the scheduling information schedules transmission of a plurality of uplink (UL) channel repetitions in a plurality of slots,
the plurality of UL channel repetitions is associated with a first sequence of redundancy versions (RVs), each repetition in the plurality of UL channel repetitions assigned a different RV in the first sequence of RVs, and
the plurality of slots include at least one full duplex (FD) slot, wherein the at least one FD slot comprises an UL subband for uplink transmissions and a downlink (DL) subband for DL transmissions within the same slot;
transmit, to the UE, an indication to cancel one or more repetitions of the plurality of UL channel repetitions scheduled by the scheduling information; and
take one or more actions related to receiving one or more remaining non-canceled repetitions of the plurality of repetitions.

\* \* \* \* \*